US011059668B1

US 11,059,668 B1

(12) United States Patent
Kalm et al.

(10) Patent No.: US 11,059,668 B1
(45) Date of Patent: Jul. 13, 2021

(54) STACKABLE INVENTORY STORAGE MODULE, SYSTEM, AND METHOD OF USING THE SAME

(71) Applicant: Amazon Technologies, Inc., Seattle, WA (US)

(72) Inventors: William Scott Kalm, Seattle, WA (US); Benjamin Douglas Garcia, Seattle, WA (US); Peter A. Grant, Seattle, WA (US); Vahideh Kamranzadeh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 16/248,200

(22) Filed: Jan. 15, 2019

Related U.S. Application Data

(60) Provisional application No. 62/617,893, filed on Jan. 16, 2018.

(51) Int. Cl.
*G06F 7/00* (2006.01)
*B65G 1/137* (2006.01)

(52) U.S. Cl.
CPC .................. *B65G 1/1373* (2013.01)

(58) Field of Classification Search
CPC .......... B65G 1/1373; B65G 1/00; B65G 1/14; B65G 1/16; B65G 1/1376
USPC ........................ 700/213–216, 218, 228–230
IPC .............. B65G 1/1373,1/00, 1/14, 1/16, 1/1376
See application file for complete search history.

(56) References Cited

U.S. PATENT DOCUMENTS

| | | | |
|---|---|---|---|
| 1,905,924 | A | 4/1933 | MacLauchlan |
| 2,999,579 | A | 9/1961 | Kostrzewa |
| 3,184,030 | A | 5/1965 | Herbert |
| 3,809,208 | A | 5/1974 | Shields |
| 3,904,022 | A | 9/1975 | Lutz |
| 4,093,086 | A | 6/1978 | Lucas et al. |

(Continued)

FOREIGN PATENT DOCUMENTS

| | | |
|---|---|---|
| DE | 2013005 A1 | 9/1971 |
| DE | 2552914 A1 | 6/1976 |

(Continued)

OTHER PUBLICATIONS

U.S. Appl. No. 15/408,128, filed Jan. 17, 2017, Battles et al.

(Continued)

*Primary Examiner* — Yolanda R Cumbess
(74) *Attorney, Agent, or Firm* — BakerHostetler

(57) ABSTRACT

In one embodiment, an inventory storage module has first and second conveyor segments that are vertically spaced from one another and third and fourth conveyor segments that connect the first and second conveyor segments to define a movement path that is elongate along a longitudinal direction. The module has a plurality of container carriers that are supported by the first to fourth conveyor segments. Each container carrier supports at least one inventory storage container that can support at least one inventory item therein. The module has at least one movement system that can push the container carriers along the first and second conveyor segments along the longitudinal direction between the first and second module ends. The storage module can translate inventory storage containers around the movement path until a desired one of the inventory storage containers is presented at one of the first and second module ends.

20 Claims, 13 Drawing Sheets

(56) References Cited

U.S. PATENT DOCUMENTS

| | | | |
|---|---|---|---|
| 4,346,803 | A | 8/1982 | Haessler et al. |
| 4,372,723 | A | 2/1983 | De Coene et al. |
| 4,378,873 | A | 4/1983 | Cloudy |
| 4,465,417 | A | 8/1984 | Baumann et al. |
| 4,645,058 | A | 2/1987 | Meyn |
| 4,934,507 | A | 6/1990 | Blocker |
| 4,972,937 | A | 11/1990 | Aarts |
| 5,387,064 | A | 2/1995 | Cardinal |
| 5,465,827 | A | 11/1995 | Nakagawa et al. |
| 5,472,309 | A | 12/1995 | Bernard, II et al. |
| 5,707,199 | A | 1/1998 | Faller |
| 6,059,229 | A | 5/2000 | Luria |
| 6,098,786 | A | 8/2000 | Brumm et al. |
| 6,336,549 | B1 | 1/2002 | Jen |
| 6,626,282 | B1 | 9/2003 | Nishizawa et al. |
| 6,752,583 | B2 | 6/2004 | Rajewski |
| 6,784,391 | B2 | 8/2004 | Takizawa |
| 6,814,214 | B2 | 11/2004 | Warlow et al. |
| 6,814,221 | B2 | 11/2004 | Goussev |
| 7,090,068 | B2 | 8/2006 | Matsuo |
| 7,381,022 | B1 | 6/2008 | King |
| 7,637,367 | B1 | 12/2009 | Cannell |
| 7,798,305 | B2 | 9/2010 | Camelli |
| 8,308,418 | B2 | 11/2012 | Ma et al. |
| 8,807,320 | B2 | 8/2014 | Fortenbery et al. |
| 8,882,433 | B2 | 11/2014 | Bonora et al. |
| 8,939,296 | B2 | 1/2015 | Weyler et al. |
| 8,972,045 | B1 | 3/2015 | Mountz et al. |
| 9,028,613 | B2 | 5/2015 | Kim et al. |
| 9,139,363 | B2 | 9/2015 | Lert |
| 9,434,558 | B2 | 9/2016 | Criswell |
| 9,520,012 | B2 | 12/2016 | Stiernagle |
| 9,550,626 | B2 | 1/2017 | Parodi et al. |
| 9,630,545 | B1* | 4/2017 | Corrigan ............... B60P 1/44 |
| 9,718,625 | B2* | 8/2017 | Huang ............... B65G 45/24 |
| 9,796,527 | B1 | 10/2017 | Kaukl et al. |
| 2008/0093313 | A1 | 4/2008 | Huber |
| 2008/0298943 | A1 | 12/2008 | Siegel et al. |
| 2010/0316468 | A1 | 12/2010 | Lert et al. |
| 2011/0313811 | A1 | 12/2011 | Urban et al. |
| 2012/0118699 | A1 | 5/2012 | Buchmann et al. |
| 2015/0098775 | A1* | 4/2015 | Razumov ............ B65G 1/0464 414/282 |
| 2015/0175354 | A1 | 6/2015 | Kharkover |
| 2015/0178673 | A1 | 6/2015 | Penneman |
| 2015/0352721 | A1 | 12/2015 | Wicks et al. |
| 2015/0360865 | A1 | 12/2015 | Massey |
| 2016/0075512 | A1 | 3/2016 | Lert, Jr. |
| 2016/0178033 | A1 | 6/2016 | Chung |
| 2016/0214796 | A1 | 7/2016 | Stefani et al. |
| 2017/0036859 | A1 | 2/2017 | Lopes Ribeiro |
| 2017/0107056 | A1 | 4/2017 | Kadaba et al. |
| 2017/0225890 | A1 | 8/2017 | Li |
| 2018/0037410 | A1 | 2/2018 | DeWitt |
| 2018/0201445 | A1 | 7/2018 | Battles et al. |
| 2018/0215534 | A1 | 8/2018 | Munholland |
| 2018/0346242 | A1* | 12/2018 | Grosse ................ B65G 1/0457 |

FOREIGN PATENT DOCUMENTS

| | | |
|---|---|---|
| DE | 3941754 A1 | 6/1991 |
| DE | 102013008872 A1 | 11/2014 |
| FR | 2292646 A1 | 6/1976 |
| GB | 1516120 A | 6/1978 |
| JP | S54-031175 A | 3/1979 |
| JP | 61-114907 A | 6/1986 |
| JP | H01-162611 A | 6/1989 |
| JP | H05-294181 A | 11/1993 |
| JP | H05-294412 A | 11/1993 |
| JP | H05-319517 A | 12/1993 |
| WO | WO 2002/074663 A1 | 9/2002 |
| WO | WO 2007/036250 A1 | 4/2007 |
| WO | WO 2014/092145 A1 | 6/2014 |
| WO | WO 2015/147033 A1 | 10/2015 |

OTHER PUBLICATIONS

U.S. Appl. No. 15/408,207, filed Jan. 17, 2017, Battles et al.
U.S. Appl. No. 15/408,182, filed Jan. 17, 2017, Battles et al.
U.S. Appl. No. 15/797,562, filed Oct. 30, 2017, Kalm et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution—53844; SSI Schafer; accessed Mar. 19, 2018; 4 pages.
"Dematic Multishuttle 2"; http://www.dematic.com/en-us/supply-chain-solutions/by-technoogy/storage-systems/dematic-multishuttle-2/; Dematic; accessed Mar. 19, 2018; 6 pages.
"AS/RS Solutions"; htbs://www.intelligrated.com/solutions/asrs-solutions; Honeywell Integrated; © 2018; accessed Mar. 19, 2018; 2 pages.
"AS/RS Systems for Distribution & Manufacturing"; http://www.cisco-eagle.com/material-handing-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWIuro; Power Automation Systems; Sep. 2011; accessed Mar. 19, 2018; 2 pages.
"AutoStore Logistic—Technical presentation"; https://www.youtube.com/watch?v=iyVDMp2bL9c; Aug. 2009; accessed Mar. 19, 2018; 3 pages.
"Scalable multi-level shuttle Navette at Karl Storz: A future-proof investments"; https://www.youtube.com/watch?v=jEygkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.
International Patent Application No. PCT/US2018/013922; Int'l Search Report and the Written Opinion; dated Jun. 21, 2018; 16 pages.
International Patent Application No. PCT/US2018/013920; Int'l Search Report and the Written Opinion; dated Jun. 21, 2018; 16 pages.

* cited by examiner

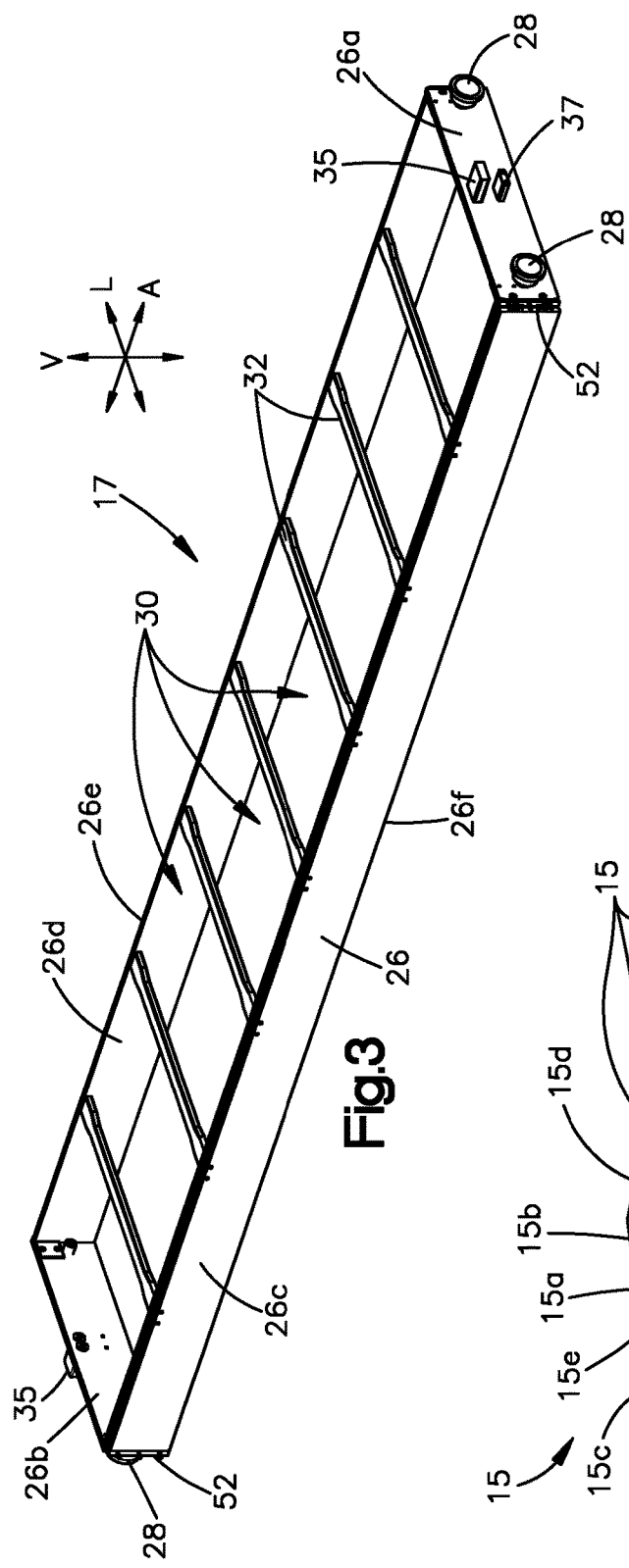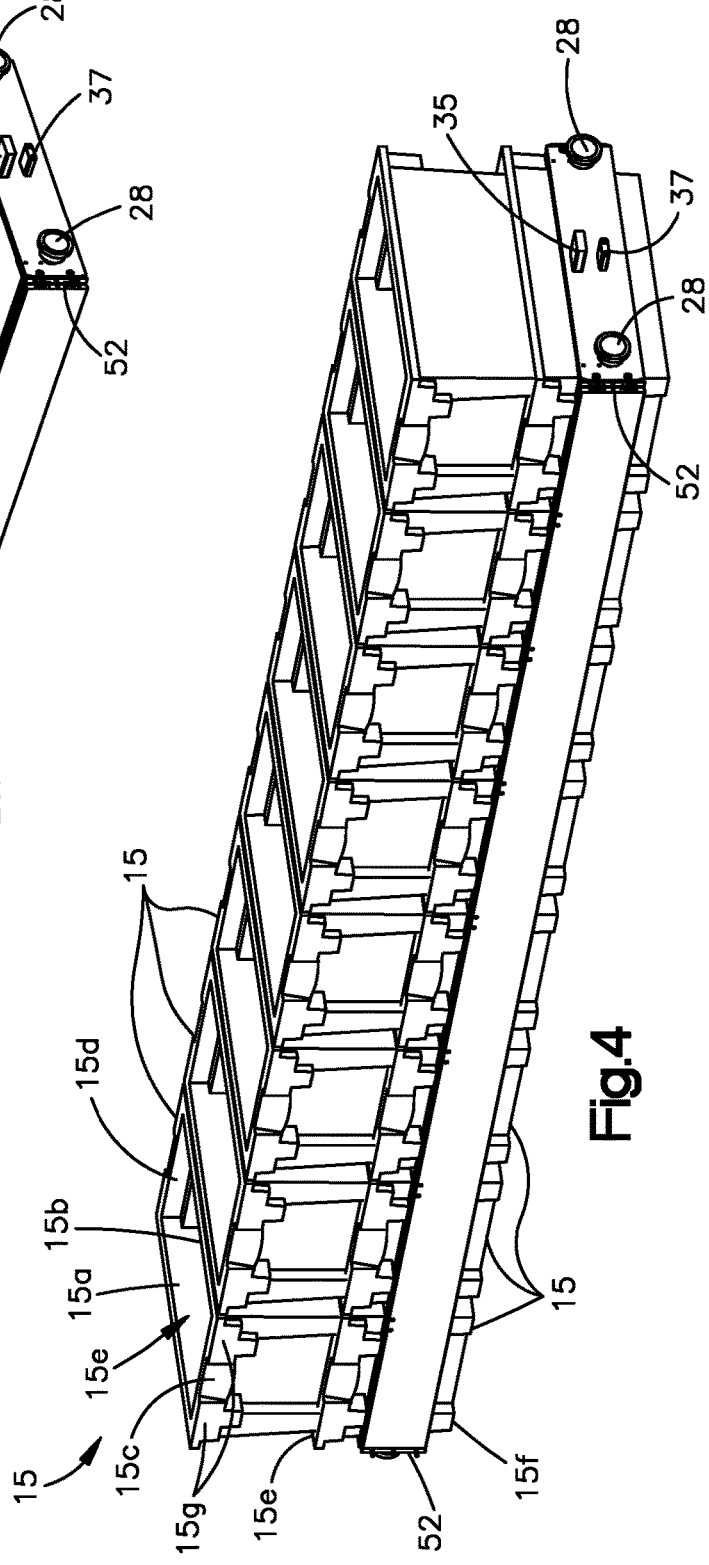

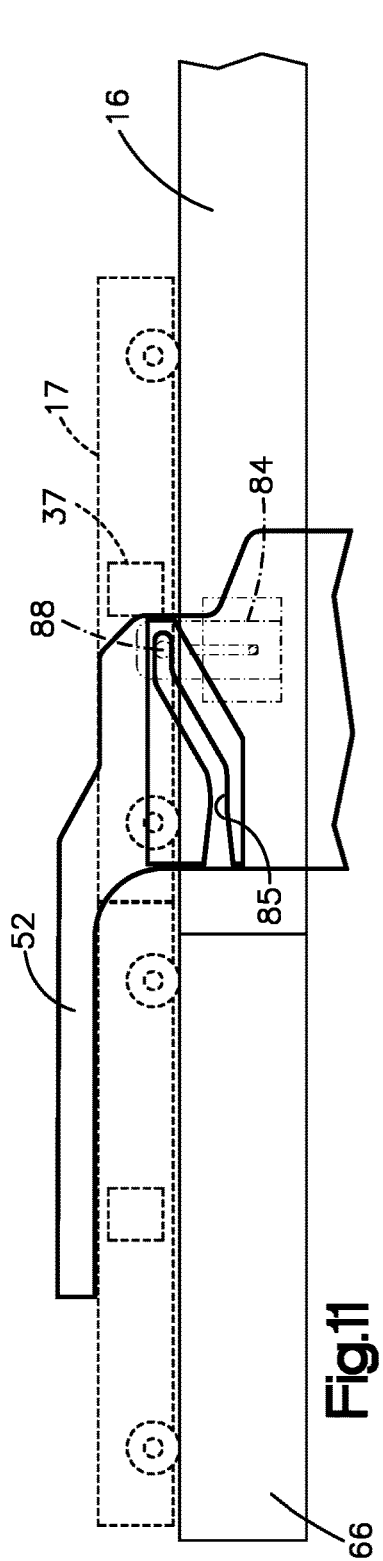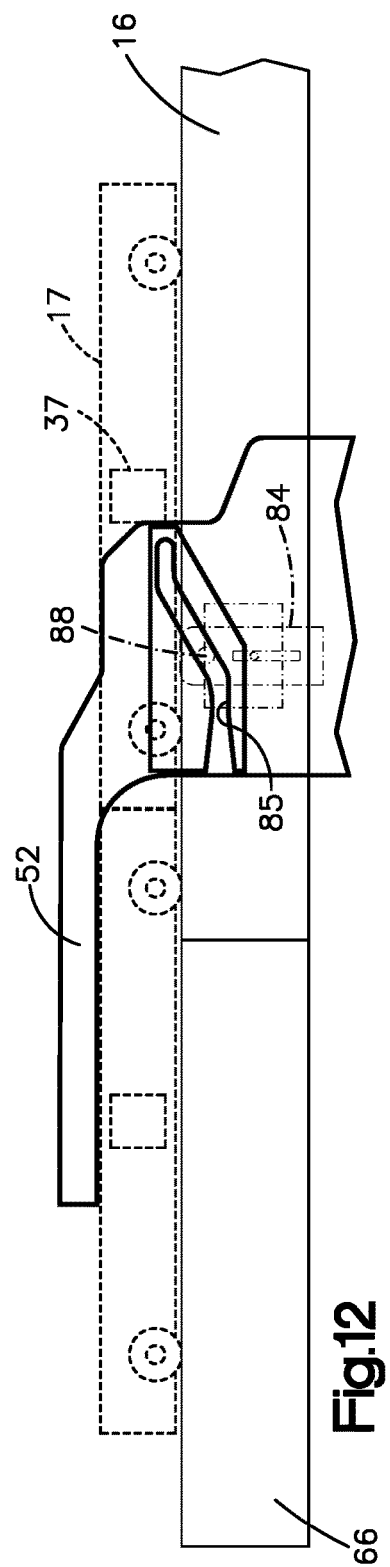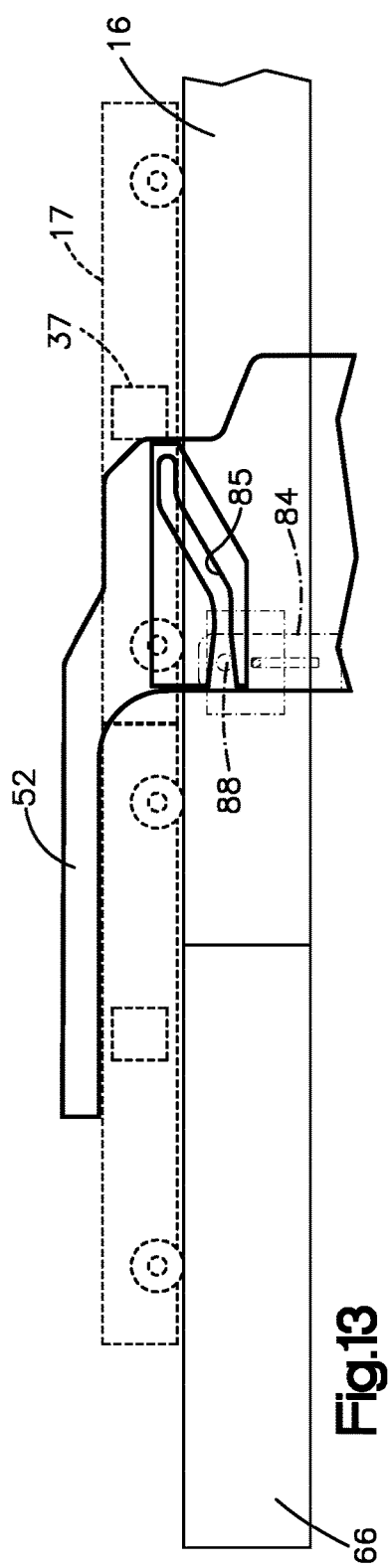

STACKABLE INVENTORY STORAGE MODULE, SYSTEM, AND METHOD OF USING THE SAME

CROSS-REFERENCE TO RELATED APPLICATIONS

This application claims priority to U.S. provisional patent application Ser. No. 62/617,893, filed Jan. 16, 2018, the teachings of all of which are hereby incorporated by reference as if set forth in their entirety herein.

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, the inventory item can be carried down an aisle in the warehouse to the desired shelving unit and placed on the desired shelving unit where it is stored until it is needed. When an order is placed, the inventory item can be retrieved from the desired shelving unit, and placed on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a perspective view of one of the container carriers of FIG. 1 according to one embodiment;

FIG. 4 shows a perspective view of the container carrier of FIG. 3 supporting a plurality of inventory storage containers;

FIG. 11 shows an enlarged elevation view of a portion of the corner of FIG. 10 with a movable container stop in an interference position where the stop interferes with a container carrier, and with the container carriers and upper conveyor segment shown transparent so that underlying features can be viewed;

FIG. 12 shows an enlarged elevation view of the portion of the corner of FIG. 11 with the movable container stop between the interference position and a released position;

FIG. 13 shows an enlarged elevation view of the portion of the corner of FIG. 11 with the movable container stop in the released position;

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Examples described herein are directed to devices, systems, and techniques for managing item storage and retrieval using stackable storage modules. In particular, the examples described herein may enable high-density storage systems including automated item storage and retrieval, with little to no human assistance. Such storage systems may be achieved by using an item movement management system (e.g., a set of computing devices) that coordinates the actions of automated material handling equipment, including stackable storage modules, using item-level data. The storage modules in their various forms described herein may enable improved item storage and retrieval as compared to conventional storage techniques. For example, the storage modules may enable improved storage density, decreased time needed for storage and retrieval of items, and fewer lost items. These improvements, along with others, may result in increased system throughput, decreased capital expenses for new storage facilities, and decreased overall operating costs.

Overview

Figure 1:
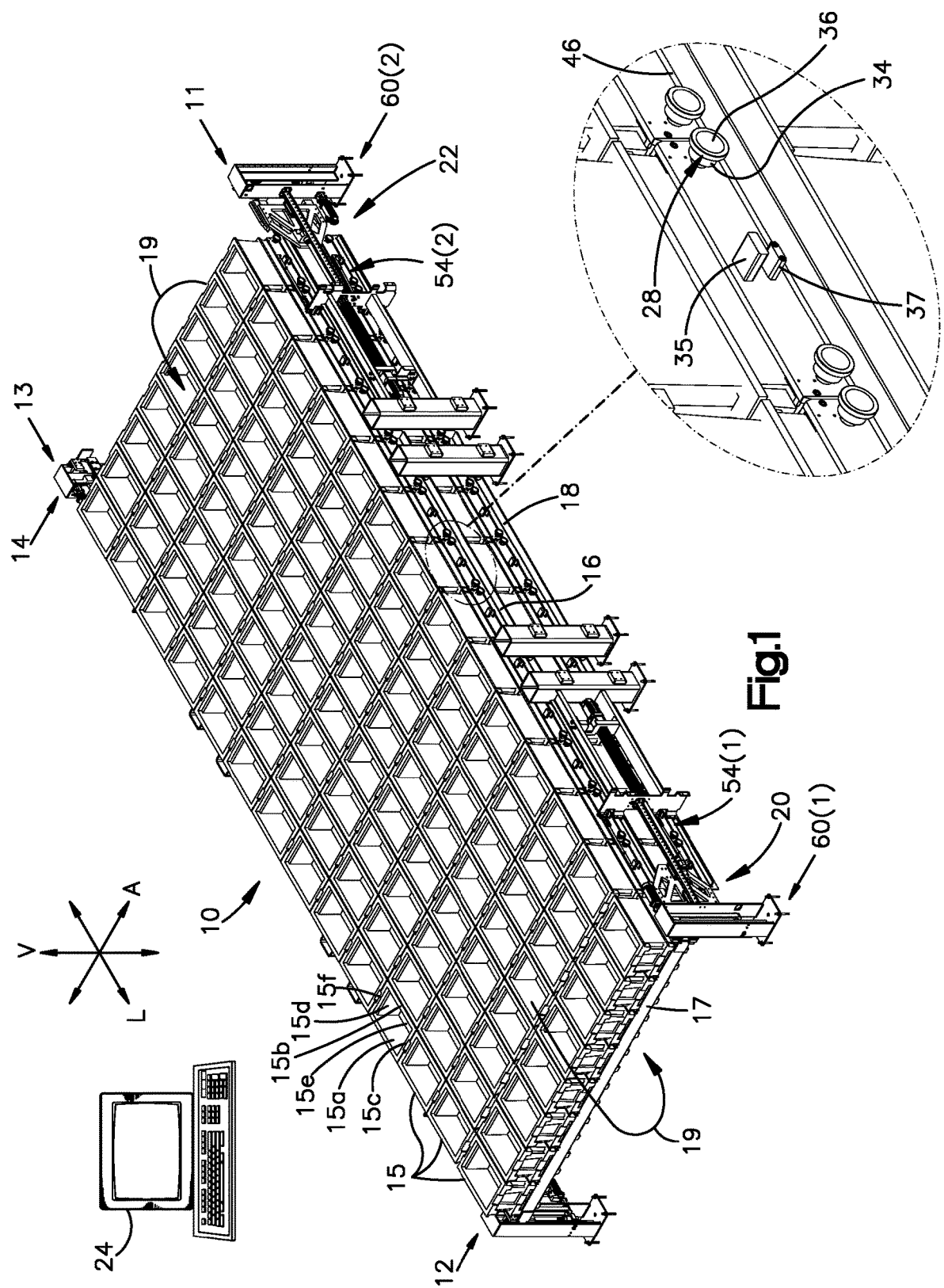
FIG. 1 shows a perspective view of a storage module according to a first embodiment having a plurality of container carriers, each supporting a plurality of inventory storage containers.
Figure 2:
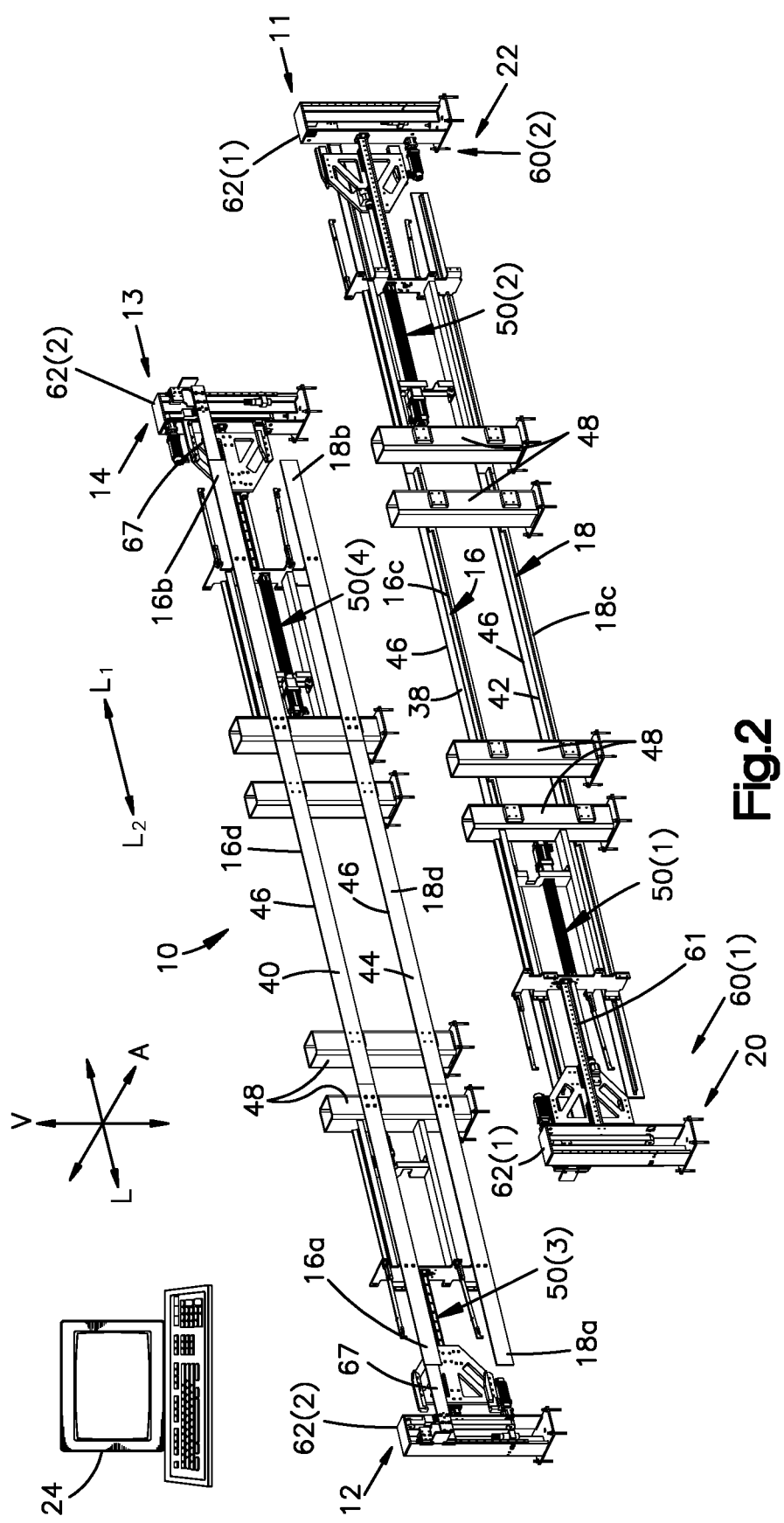
FIG. 2 shows a perspective view of the storage module of FIG. 1 without the container carriers or inventory storage containers.

Referring generally to the FIGS. 1 and 2, an inventory storage module 10 has a first module end 12 and a second module end 14 spaced from one another along a longitudinal direction L. The storage module also has a first module side 11 and a second module side 13 spaced from one another along a lateral direction A, perpendicular to the longitudinal direction L. The longitudinal direction L can be a first horizontal direction, and the lateral direction A can be a second horizontal direction. The storage module 10 is elongate from its first module end 12 to its second module end 14 along the longitudinal direction L. For example, the storage module 10 has a module length along the longitudinal direction L from its first module end 12 to its second module end 14 that is greater than a module width of the storage module 10 from its first module side 11 to its second module side 13 along the lateral direction A. The module length can also be greater than a module height along a vertical direction V, perpendicular to both the longitudinal direction L and the lateral direction A. The overall dimensions (e.g., module length, module width, and module height) of the storage module 10 may be selected to optimize storage density of the stackable storage module or other suitable parameter. For example, the dimensions may be selected to fit within a particular structure (e.g., a shipping container or warehouse).

The storage module 10 has a plurality of conveyor segments that define a movement path 19. The storage module 10 is configured to move inventory storage containers 15 around the movement path 19. The movement path 19 can have a closed shape, such as a rectangle, a loop, an oval, or any other suitable closed shape. For example, the storage module 10 has a first conveyor segment 16 and a second conveyor segment 18 that extend along the longitudinal direction L. The storage module 10 also has a third conveyor segment 20 adjacent the first module end 12 and a fourth conveyor segment 22 adjacent the second module end 14. The movement path 19 can be elongate along the longitudinal direction L. Thus, the movement path 19 can have a length along the longitudinal direction L that is greater than a height of the movement path along the vertical direction V and a width of the movement path 19 along the lateral direction A.

The movement path 19 can be considered to be a closed movement path in that that first to fourth conveyor segments 16, 18, 20, and 22 transfer storage containers 15 only around the movement path 19, without transferring storage containers 15 outside of the movement path 19. However, it will be understood that the storage containers 15 can be removed from, and placed back into, the movement path 19 by a person or machine such as a robotic arm.

The conveyor segments 16, 18, 20, and 22 of the storage module 10 are configured to translate inventory storage containers 15 around the movement path 19 until a desired one of the storage containers 15 is presented at one of the first module end 12 and the second module end 14. Preferably, the inventory storage containers 15 are open-top totes configured to carry items in an e-commerce supply chain. In some embodiments, the storage module 10 can include a plurality of container carriers 17, where each container carrier 17 is configured to support at least one of the inventory storage containers 15. In such embodiments, the conveyor segments 16, 18, 20, and 22 can be configured to transfer the container carriers 17 around the movement path 19 until a desired one of the container carriers 17 is presented at one of the first and second module ends 12 and 14. At such position, the desired storage container 15 can be accessed by a person, or machine such as a robotic arm, so that an inventory item can then be placed onto the desired storage container 15 for storage or can be removed from the desired storage container 15 to fulfill a customer order or for further transporting or processing. Additionally or alternatively, the person or machine can remove storage containers 15 from the storage module and place storage containers 15 onto the storage module.

Each of the first and second conveyor segments 16 and 18 are configured to transfer inventory storage containers 15 along the longitudinal direction L between the third and fourth conveyor segments 20 and 22. Thus, the first and second conveyor segments 16 and 18 can be considered to be longitudinal conveyor segments. Each of the third and fourth conveyor segments 20 and 22 are configured to transfer storage containers 15 between the first and second conveyor segments 16 and 18. Thus, the third and fourth conveyor segments 20 and 22 can be considered to be connecting conveyor segments. In some embodiments, the third and fourth conveyor segments 20 and 22 can be implemented as first and second vertical lifts 60(1) and 60(2) that raise and lower storage containers 15 along the vertical direction V.

The storage module 10 can include one or more movement systems (e.g., 50(1)-50(4) in FIG. 2) that are configured to move the inventory storage containers 15 along the movement path 19. Each movement system can include a catch (e.g., 52 in FIG. 5) that is configured to engage at least one of a container carrier 17 (discussed below) and a storage container 15 so as to move the at least one of the container carrier 17 and a storage container 15 along the movement path 19.

The storage module 10 can operate in a unidirectional manner such the storage containers 15 can be moved in only a first direction (that is, clockwise or counterclockwise) around the movement path. Alternatively, the storage module 10 can operate in a bidirectional manner such the storage containers 15 can be selectively rotated in one of the first direction and a second direction, opposite the first direction. The movement and positioning of storage containers 15 can be controlled by at least one controller 24, which can be in wired or wireless communication with the segments of the storage module. The at least one controller 24 can be configured to provide at least one control signal to the vertical lifts 60(1) and 60(2) and to at least one movement system 50(1) to 50(4) so as to control the movement of the container carriers 17 around the movement path 19. In some embodiments, the controller 24 can control the speed in which the storage container 15 are moved. Further, in some embodiments, the controller 24 can control the direction in which the container carriers 17 are moved. Yet further, in some embodiments, the controller 24 can stop the vertical lifts 60(1) and 60(2) and the at least one movement system 50(1) to 50(4) when a desired one of the container carriers 17 is presented at one of the first end 12 and the second end 14.

The storage module 10 can include one or more sensors (not shown) to provide sensor data that can be used to manage the operation of the stackable storage module. For example, a position sensor may be used to detect positions of the storage container carriers and/or containers 15. As an additional example, an optical scanner may be used to scan the identifier. Other sensors relating to control of the drive motor of the movement system may also be provided. In some examples, other sensors are provided to detect when items protrude out of the storage containers 15 in a way that could be problematic. For example, because the tolerances between modules or between levels of a module may be very tight, it may be desirable that items do not extend beyond a top of the storage containers 15.

The storage module 10 may also include any suitable number of mechanical connections, electrical connections, and network connections to stabilize each module or stack of modules, and to implement the techniques described herein. For example, the mechanical connections may be used to couple two or more stackable storage modules together. The electrical connections may be used to provide power to each movement system and other electrical devices (e.g., sensors). The network connections may enable computer control of the stackable storage modules. In some examples, the stackable storage module may include a local computing device, control chip, or other device to control the operation of the stackable storage module. The device may include non-volatile data storage to store certain data associated with the stackable storage module. For example, such data may include location data for storage containers 15, location data for items in the storage containers 15, and an order of the storage containers 15 (e.g., location of a storage container 15 with respect to other storage containers 15 and/or the carrier movement path 19).

Conveyor Segments

With continued reference to FIGS. 1 and 2, the first and second longitudinal conveyor segments 16 and 18 can be offset from one another along the vertical direction V. Thus, the first and second longitudinal conveyor segments 16 and 18 can be considered to be upper and lower conveyor segments, respectively. The movement path 19 is defined in a plane that extends along the vertical direction V and the longitudinal direction L. Further, the module height can be defined from the first longitudinal conveyor segment 16 to the second longitudinal conveyor segment 18. In alternative embodiments (not shown), the first and second longitudinal conveyor segments 16 and 18 can be offset from one another along the lateral direction A. In such embodiments, the movement path 19 is defined in a plane that extends along the longitudinal direction L and the lateral direction A (i.e., a horizontal plane).

The first and second conveyor segments 16 and 18 extend between the first module end 12 and the second module end 14, and between the first module side 11 and the second module side 13. The first and second conveyor segments 16 and 18 are each elongate along the longitudinal direction L. For example, each of the first and second conveyor segments 16 and 18 has a segment length along the longitudinal direction L and a segment width along the lateral direction A, where the segment length is greater than the segment width. Each of the longitudinal conveyor segments 16 and 18 can include a conveyor surface, and the storage module can be configured to transfer storage containers 15 along the conveyor surfaces along the longitudinal direction L. The conveyor surfaces are defined by tracks; however, in alternative embodiments, the conveyor surfaces can be defined by other suitable conveyor elements such as belts, rollers, skate wheels, balls, any other suitable conveyor elements for translating the storage containers 15, or any suitable combination of conveyor elements.

The first conveyor segment 16 has a first segment end 16a, and a second segment end 16b that is offset from the first segment end 16a along the longitudinal direction L. The first and second segment ends 16a and 16b can be terminal free ends that are free from a fixed connection to another track. The first conveyor segment 16 is elongate from the first segment end 16a to the second segment end 16b. The first conveyor segment 16 has a first lateral side 16c and a second lateral side 16d spaced from the first lateral side 16c along the lateral direction A, perpendicular to the longitudinal direction L. The first conveyor segment 16 further has at least a one conveyor surface 46 (which may be referred to as a first conveyor surface) that extends between the first and second segment ends 16a and 16b.

The first conveyor segment 16 is configured to transfer container carriers 17, and hence storage containers 15, along the first conveyor surface 46 from the first terminal free end 16a to the second terminal free end 16b along a first longitudinal direction $L_1$ when the storage module 10 operates in a clockwise direction as viewed. Additionally or alternatively, the first conveyor segment 16 can be configured to transfer container carriers 17 along the conveyor surface 46 from the second end 16b to the first end 16a along a second longitudinal direction $L_2$, opposite the first longitudinal direction $L_1$, when the storage module 10 operates in a counterclockwise direction as viewed.

Similarly, the second conveyor segment 18 has a first segment end 18a, and a second segment end 18b that is offset from the first terminal free end 18a along the longitudinal direction L. The first and second segment ends 16a and 16b can be terminal free ends that are free from a fixed connection to another track. The second conveyor segment 18 is elongate from the first segment end 18a to the second segment end 18b. The second conveyor segment 18 has a first lateral side 18c and a second lateral side 18d spaced from the first lateral side 18c along the lateral direction A. The second conveyor segment 18 further has at least one conveyor surface 46 (which can be referred to as a second conveyor surface) that extends between the first and second segment ends 18a and 18b.

The second conveyor segment 18 is configured to transfer container carriers 17, and hence storage containers 15, along the second conveyor surface 18e from the second end 18b to the first end 18a along the second longitudinal direction L2 when the conveyor segments operate in a clockwise direction as viewed. Additionally or alternatively, the second conveyor segment 18 can be configured to transfer container carriers 17 along the second conveyor surface 46 from the first end 18a to the second end 18b along the first longitudinal direction L1 when the conveyor segments operate in a counterclockwise direction as viewed.

The upper and lower conveyor segments 16 and 18 include tracks configured to support the container carriers 17, and the container carriers 17 are configured to move along the tracks. For example, the upper conveyor segment 16 includes a first upper track 38 and a second upper track 40 offset from one another along the lateral direction A by a track width WT. Similarly, the lower conveyor segment 18 includes a first lower track 42 and a second lower track 44 offset from one another along the lateral direction A by the track width WT. Each of the tracks of the upper and lower conveyor segments 16 and 18 are elongate along the longitudinal direction L. Each of the tracks of the upper and lower conveyor segments 16 and 18 can include an upper track surface 46 that is configured to support wheels of the container carriers 17.

The storage module 10 can include one or more supports that couple the upper and lower conveyor segments 16 and 18 to one another. For instance, the storage module 10 can include one or more supports, such as one or more posts 48, that are coupled to the first upper track 38 and the first lower track 42 so as to position the first upper track 38 above the first lower track 42. Similarly, the storage module 10 can include one or more supports, such as one or more posts 48, that are coupled to the second upper track 40 and the second lower track 44 so as to position the second upper track 40 above the second lower track 44. The storage module 10 can optionally include one or more supports (not shown) that couple the first upper track 38 to the second upper track 40 so as to space the first and second upper tracks 38 and 40 from one another along the lateral direction A, and one or more supports (not shown) that couple the first lower track 42 to the second lower track 44 so as to space the first and second lower tracks 42 and 44 from one another along the lateral direction A.

The storage containers 15 in the storage module 10 can be densely packed along the vertical direction V. In particular, the storage containers 15 on the upper conveyor segment 16 can be stacked above the storage containers 15 on the lower conveyor segment 18 so that the space between each storage container 15 on the bottom level and the first conveyor segment 16 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage containers, such as no more than 15 percent of the height of the storage containers, such as no more than 10 percent of the height of the storage containers, or such as no more than 5 percent of the height of the storage containers. Storage density is inversely proportional to the distance between a storage container and the conveyor segment 16 immediate over top of the storage container. Thus, as this distance is decreased, the storage density increases.

The third and fourth conveyor segments 20 and 22 are offset from one another along the longitudinal direction L. Each of the third and fourth conveyor segments 20 and 22 are configured to transfer container carriers, and hence storage containers 15, between the first and second conveyor segments 16 and 18. For example, each of the third and fourth conveyor segments 20 and 22 can be configured to convey storage containers 15 along the vertical direction V from one of the first and second conveyor segments 16 and 18 to the other one of the first and second conveyor segments 16 and 18. The storage module 10 can be configured such that, when the third and fourth conveyor segments 20 and 22 transfer container carriers 17, at least some, up to all, of the container carriers 17 on the upper and lower conveyor segments 16 and 18 remain stationary. The storage module 10 can be configured such that, when the container carriers 17 are moved along the upper and lower conveyor segments 16 and 18, the third and fourth conveyor segments 20 and 22 do not move any container carriers 17.

The third and fourth conveyor segments 20 and 22 can be implemented as first and second vertical lifts 60(1) and 60(2), respectively, that are configured to transfer the container carriers 17, and hence storage containers 15 along the vertical direction V between the first and second conveyor segments 16 and 18. Thus, the first and second conveyor segments 16 and 18 can each define a discontinuous conveyor segment, and the vertical lifts can transfer the storage containers 15 between the discontinuous conveyor segments. In other embodiments (not shown), the third and fourth conveyor segments 20 and 22 can include conveyor surfaces such as (without limitation) tracks that connect the first and second conveyor segments 16 and 18. Thus, in such embodiments, the first to fourth conveyor segments 16, 18, 20, and 22 together can define a continuous conveying surface or track.

Storage Containers

Turning to FIG. 4, each storage container 15 can be any suitable storage container configured to carry one or more inventory items therein. Preferably, the inventory storage containers 15 are open-top plastic totes configured to carry items in an e-commerce supply chain. The totes are of a size that an individual person or robot can lift. For example, each storage container 15 can be a rectangular structure, such as a bin or tote, formed from a rigid material such as high-density plastic, wood, aluminum, or other suitable material. Each storage container 15 can have a pair of opposed container sidewalls 15a and 15b that are spaced opposite from one another. Each storage container 15 can have a pair of opposed container end walls 15c and 15d that are spaced opposite from one another. The opposed container end walls 115c and 115d can extend between the opposed container sidewalls 15a and 15b. Similarly, the opposed container sidewalls 15a and 15b can extend between the opposed container end walls 15c and 15d.

Each container 15 has a width $W_S$ from one of the sidewalls 15a and 15b to the other one of the sidewalls 15a and 15b, and has a length $L_S$ from one of the end walls 15c and 15d to the other one of the end walls 15c and 15d. In some embodiments, the length $L_S$ can be greater than the width $W_S$. Each storage container 15 can further have an upper end 15e and a bottom surface 15f spaced from one another along the vertical direction V. The bottom surface 15f can extend between the opposed sidewalls 15a and 15b and between the opposed end walls 15c and 15d. The upper end 15e can be open for ease of access in placing inventory items into, and retrieving inventory items from, the storage container 15. Each container 15 can have a height Hs from the upper end 15e to the bottom surface 15f.

The size of a storage container 15 may be selected to optimize storage density of the stackable storage module or other suitable parameter. This may depend on the size and type of items to be stored in the storage container 15. For example, the storage container 15 may have a height of about 18", a width of about 18", and a length of about 24". However, the dimensions of the storage container 15 can be different than those just recited. The items held by the storage container 15 can be any suitable item stored in a material storage facility including, for example, personal electronic devices, computers, recreational equipment, food products, television sets, clothing, household supplies, automotive parts, books, loaded pallets, and any other suitable object capable of being stored.

The storage containers 15 can be stackable on top of one another. For example, the bottom surface 15f of an upper one of the storage containers 15 can be received in the opening of the upper end 15e of a lower one of the storage containers 15. The upper end 15e of the lower storage container 15 can be configured to support the bottom surface 15f of the upper storage container 15 such that the bottom surface 15f of the upper storage container 15 nests inside the opening of the lower storage container 15. Each container 15 can also include at least one protrusion 15g, each extending outwardly from at least one of the container sidewalls and end walls. For example, each container 15 can include a plurality of protrusions 15g, each extending outwardly from at least one of the sidewalls and end walls at a corner of the container 15 adjacent the upper end 15e. At least one protrusion 15g can define a handle that is configured to be configured to be engaged by a human hand for carrying. At least one protrusion 15g can include a lower surface that is configured to be engaged by a tine of an end effector of a robotic arm (not shown), fork lift, or other lifting machine.

For example, a storage container 15 can include a pair of the protrusions 15g disposed on opposite sides or ends of the container 15 that are configured to engage a pair of tines.

Each storage container 15 may include an identifier (e.g., bar code, QR code, radio-frequency identification (RFID) tag, and any other suitable identifier). The identifier may be used to uniquely identify the storage container 15. In some examples, the identifier may include non-volatile data storage, which may be associated with the storage container 15 and/or its contents. Data can be read/written to the data storage each time the stackable storage module is accessed. This data may contain status of the stackable storage module, inventory stowed in the stackable storage module, and/or destination information for each storage container 15. In this manner, inventory information may be updated when the identifiers are read.

Container Carriers

Turning now to FIGS. 3 and 4, each container carrier 17 is configured to support at least one inventory storage container 15. As shown, in some embodiments, each container carrier 17 can be configured to support a row of inventory storage containers 15 such that the storage containers 15 are offset from one another along the lateral direction A. For example, each storage container carrier 17 can be configured to support the storage containers 15 in a side-by-side relation such that the opposed sidewalls 15a and 15b of each storage container 15 are spaced from one another along the lateral direction A and at least one sidewall 15a or 15b of each storage container 15 faces a sidewall 15a or 15b of one another one of the storage containers 15 along the lateral direction A. In alternative embodiments (not shown), each container carrier 17 can be configured to support the storage containers 15 in an end-to-end relation such that the opposed end walls 15c and 15d of each storage container 15 are spaced from one another along the lateral direction A and at least one end wall 15c or 15d of each storage container 15 faces an end wall 15c or 15d of one another one of the storage containers 15 along the lateral direction A. Each container carrier 17 can also be configured to support the storage containers 15 in a stacked relation, such that each of one or more containers 15 of the first row has a container stacked thereon. Thus, each container carrier 17 can be configured to support the first row of storage containers 15 and at least a second row of storage containers 15 stacked on the first row. In alternative embodiments, each container carrier 17 can be configured to carry as few as a single storage container 15. Each container carrier 17 can be configured to support its at least one storage container 15 such that an open top of each of the at least one storage container 15 is open to an area above the container carrier 17. For example, each container carrier 17 can be configured to support its at least one storage container 15 such that the container carrier 17 does not obstruct the open top of each of its at least one storage container 15. Thus, each container carrier 17 can be said to have an open top.

Each container carrier 17 can have a rectangular or other suitably shaped carrier body 26. The carrier body 26 can have a pair of opposed carrier sides 26a and 26b that are spaced opposite from one another along the lateral direction A. The carrier body 26 can have a pair of opposed carrier ends 26c and 26d that are spaced opposite from one another along the longitudinal direction L. The opposed carrier ends 26c and 26d can extend between the opposed carrier sides 26a and 26b. Similarly, the opposed carrier sides 26a and 26b can extend between the opposed carrier ends 26c and 26d. The carrier body 26 has a width $W_S$ from one of the carrier sides 26a and 26b to the other one of the carrier sides 26a and 26b, and has a length $L_S$ from one of the carrier ends 26c and 26d to the other one of the carrier ends 26c and 26d. The carrier width $W_S$ can be greater than the carrier length $L_S$.

Each carrier body 26 can include a carrier upper end 26e and a carrier lower end 26f spaced from one another along the vertical direction V. Each carrier body 26 can define a plurality of openings 30 that extend through the upper and lower ends 26e and 26f. Further, each carrier body 26 can include at least one divider 32, such as a plurality of dividers 32. Each divider 32 can extend from one of the carrier ends 26c and 26d to the other along the longitudinal direction L. Each divider 32 can separate adjacent ones of the openings 30. Each opening 30 can be sized to receive a storage container 15 therein. Each opening 30 can be sized such that a lower portion of a corresponding container 15 extends through the opening 30, and the carrier upper end 26e supports an upper portion of the container 15. For example, each opening 30 can have a dimension along a select direction that is greater than a corresponding dimension along the select direction of one of the storage containers 15 at its bottom surface 15f, but less than a dimension along the select direction of the storage container 15 at a location that includes the at least one protrusion 15g. Thus, when a storage container 15 is supported by a container carrier 17, the at least one protrusion 15g of the storage container 15 rests on the container carrier 17, such as on the carrier upper end 26e.

Each container carrier 17 can include at least one conveyor-segment engagement feature that is configured to engage the conveyor segments 16, 18, 20, and 22 so that the container carrier 17 can be translated around the movement path 19. Each of the at least one conveyor-segment engagement feature can be disposed at one of the carrier sides 26a or 26b or can be disposed at another location of the container carrier 17. In some embodiments, the at least one conveyor-segment engagement feature can include at least one wheel assembly 28, such as a plurality of wheel assemblies 28. However, it will be understood that, in alternative embodiments, the at least one conveyor segment engagement feature can include a feature other than a wheel assembly. For example, each conveyor-segment engagement feature can be a rod or pin that engages a bearing or chain of tracks of the conveyor segments 16, 18, 20, and 22.

Each wheel assembly 28 includes a wheel 34 (see the enlarged detail view in FIG. 1) that rotates about an axis that extends along the lateral direction A. The container carriers 17 are configured such that their respective wheels 34 roll along the upper track surfaces 46 of the conveyor segments. Each wheel assembly 28 can include a flange 36 that is outwardly spaced from the wheel 34 along the lateral direction A. Each wheel 34 can have a wheel diameter along a select direction that is perpendicular its rotational axis, and each flange 36 can have an outer dimension along the select direction that is greater than the wheel diameter. Each flange 36 is configured to ride along an outer side of the upper and lower tracks so as to prevent its respective wheel 34 from riding off of the tracks. Each wheel assembly 28 can additionally or alternatively include an inward flange (not shown) that is configured in a manner similar to that described above but is inwardly spaced from the wheel 34 along the lateral direction A. Each inward flange can be configured to ride along an inner side of the upper and lower tracks so as to prevent its respective wheel 34 from riding off of the tracks.

The wheel assemblies 28 of each container carrier 17 can include a first wheel assembly 28 at a first carrier side 26a and a second wheel assembly 28 at a second carrier side 26b. The wheels 34 of the first and second wheel assemblies 28 can be spaced from one another along the lateral direction A by the track width WT. Thus, the wheels 34 of the first and second wheel assemblies 28 are spaced from one another such that the wheels 34 ride along tracks of the first to fourth conveyor segments 16, 18, 20, and 22. Each container carrier 17 can optionally include a third wheel assembly 28 at the first carrier side 26a and a fourth wheel assembly at the second carrier side 26b. The third and fourth wheel assemblies 28 can be spaced from the first and second wheel assemblies along the longitudinal direction L. The wheels 34 of the third and fourth wheel assemblies 28 can be spaced from one another along the lateral direction A by the track width WT. Thus, the wheels 34 of the third and fourth wheel assemblies 28 can be spaced from one another such that the wheels 34 ride along tracks of the first to fourth conveyor segments 16, 18, 20, and 22.

Each container carrier 17 can include at least one stop 35. Each stop 35 can be a protrusion that extends outwardly from one of the carrier sides 26a and 26b. For example, each container carrier 17 can include first and second stops 35, wherein the first stop 35 extends from a first carrier side 26a and the second stop 35 extends from a second carrier side 26b. The first and second stops 35 can be offset from one another along the lateral direction A by the track width WT. In other words, the first and second stops 35 can be aligned over the first and second tracks of one of the upper and lower conveyor segments 16 and 18 along the vertical direction V. Thus, each stop 35 can be configured to contact one of the first and second tracks to prevent the container carrier 17 from falling down below the tracks in the event that one or more of the carrier wheel assemblies 28 breaks or separates from the container carrier body 26.

Each container carrier 17 can include at least one actuator engagement feature 37 that is configured to be engaged by an actuator to move the container carrier 17 along the upper and lower conveyor segments 16 and 18. Each actuator engagement feature 37 can be a protrusion that extends outwardly from a respective one of the carrier sides 26a and 26b. For example, each container carrier 17 can include first and second engagement features 37, wherein the first engagement feature 37 extends from the first carrier side 26a and the second engagement feature 37 extends from the second carrier side 26b. In alternative embodiments, the engagement feature 37 can be a side or end of a container carrier 17 or another suitable feature such as an opening that receives a protrusion carried by an actuator assembly.

Each container carrier 17 can include at least one bumper (not shown), such as a plurality of bumpers, each disposed on an outer surface of one of the carrier ends 26c or 26d. The bumpers are configured and positioned to abut adjacent container carriers 17 so as to limit contact between the container bodies 26 of adjacent container carriers 17, or prevent such contact altogether. The bumpers are configured to dampen noise that results from the container carriers 17 colliding with one another as they are moved around the movement path 19. The bumpers can be pieces of a noise dampening material such as rubber, silicone, or other suitable material for dampening noise, and may have any suitable shape.

The storage containers 15 can be densely packed within each container carrier 17 along the lateral direction A. For example, the storage containers 15 carried by each container carrier 17 can be arranged side-to-side (or end-to-end) such that there is little to no space between adjacent ones of the storage containers 15. In some embodiments, storage containers 15 carried by each container carrier 17 may contact one another other. In other embodiments, the storage containers 15 may be spaced from each other by a distance that is no more than 10 percent of the overall width of each storage container 15 or no more than 5 percent of the overall width of each storage container 15.

The storage containers 15 can be supported by the container carriers 17 along the upper and lower conveyor segments 16 and 18 such that the storage containers 15 are densely packed along the upper and lower conveyor segments 16 and 18. For example, the container carriers 17 carried by the upper conveyor segment 16 can be arranged end-to-end such that there is little to no space between storage containers 15 of adjacent ones of the container carriers 17. Similarly, the container carriers 17 carried by the lower conveyor segment 18 can be arranged end-to-end such that there is little to no space between storage containers 15 of adjacent ones of the container carriers 17. In some embodiments, the container carriers 17 and/or storage containers 15 along each conveyor segment may contact one another other. In other embodiments, the storage containers 15 supported by adjacent container carriers 17 may be spaced from each other by a distance that is no more than 10 percent of the overall length or width of each storage container 15 along the longitudinal direction L or no more than 5 percent of the overall length or width of each storage container 15 along the longitudinal direction L. As each container carrier 17 is moved from one of the first and second conveyor segments 16 and 18 to the other, the container carrier 17 is separated from the container carriers 17 supported by the first and second conveyor segments 16 and 18, thereby avoiding collisions between the moving container carrier 17 and the container carriers 17 supported by the first and second conveyor segments 16 and 18. As a result, the storage containers 15 supported by the first and second conveyor segments 16 and 18 can be spaced closer to one another than in comparable carousel systems where all of the storage units are rotated concurrently.

In at least some examples, the container carrier 17 also includes an identifier. The identifiers may be used to identify a position of the container carrier 17 (and the storage container 15) with respect to the stackable storage module. In some examples, the stackable storage module (or system in which the stackable storage module is implemented) may include any suitable combination of encoders, RFID readers and antenna, cameras, and/or other sensing devices for identifying and locating the container carriers 17 and/or the storage containers 15.

Movement System

Returning to FIG. 2, the storage module 10 includes at least one movement system 50 configured to engage the container carriers 17 (or storage containers 15) to push the container carriers 17 along the tracks of the upper and lower conveyor segments 16 and 18. The at least one movement system 50 and the vertical lifts 60(1) and 60(2) can operate in alternating fashion. Thus, the at least one movement system can push container carriers 17 along the longitudinal direction L, while the vertical lifts 60(1) and 60(2) are not transferring container carriers 17 along the vertical direction V. The first and second vertical lifts 60(1) and 60(2) can be configured to transfer container carriers 17 along the vertical direction, while the at least one movement system 50 is not pushing container carriers 17 along the longitudinal direction L.

In some embodiments, the storage module 10 can include a plurality of movement systems 50 configured to move the container carriers 17. For instance, the storage module 10 can include a first movement system 50(1) disposed adjacent the first module end 12 that is configured to engage a container carrier 17 so as to push the container carrier 17 towards the second module end 14. The container carrier 17 engaged by the first movement system 50(1) in turn pushes the downstream container carriers 17 towards the second module end 14. The first movement system 50(1) can push the container carriers 17 along the longitudinal direction without causing any container carriers 17 to move between the upper and lower conveyor segments 16 and 18.

The storage module 10 can include a second movement system 50(2) disposed adjacent the second module end 14 that is configured to engage a container carrier 17 so as to push the container carrier 17 towards the first module end 12. The container carrier 17 engaged by the second movement system 50(2) in turn pushes the downstream container carriers 17 towards the first module end 12. The second movement system 50(2) can push the container carriers 17 along the longitudinal direction without causing any container carriers 17 to move between the upper and lower conveyor segments 16 and 18.

The storage module 10 can include a third movement system 50(3) disposed adjacent the first module end 12 and configured to engage a container carrier 17 so as to push the container carrier 17 towards the second module end 14. The container carrier 17 engaged by the third movement system 50(3) in turn pushes the downstream container carriers 17 towards the second module end 14. The third movement system 50(3) can be spaced from the first movement system 50(1) along the lateral direction A, and can be configured to operate together with the first movement system 50(1). Thus, the first movement system 50(1) can be configured to engage a container carrier 17 at its first carrier side 26a, and the third movement system 50(3) can be configured to engage the container carrier 17 at its second carrier side 26b.

The storage module 10 can include a fourth movement system 50(4) disposed adjacent the second module end 14 that is configured to engage a container carrier 17 so as to push the container carrier 17 towards the first module end 12. The container carrier 17 engaged by the fourth movement system 50(4) in turn pushes the downstream container carriers 17 towards the first module end 12. The fourth movement system 50(4) can be spaced from the second movement system 50(2) along the lateral direction A, and can be configured to operate together with the second movement system 50(2). Thus, the second movement system 50(2) can be configured to engage a container carrier 17 at its first carrier side 26a, and the fourth movement system 50(4) can be configured to engage the container carrier 17 at its second carrier side 26b.

Turning now to FIGS. 5 to 8, cross-sectional views are shown of a first corner of the storage module 10 defined by the first module end 12 and the second module side 13 (in FIG. 2). Each cross-sectional view is taken along a plane that extends along the vertical direction V and the longitudinal direction L through the container carriers 17. Note that only a portion of each container carrier 17 is shown that includes the second carrier side 26b. Further, the storage containers 15 are omitted, and the second carrier side 26b is shown as transparent so that features behind the second carrier side 26b can be viewed. It will be understood that the second corner of the first module end 12 (i.e., at the first module side 11) can be a substantial mirror image of the first corner about a plane that extends along the vertical direction V and longitudinal direction L, although embodiments of the disclosure are not so limited. Further, the second module end 14 can be implemented as a mirror image of the first module end 12 about a plane that extends along the vertical direction V and lateral direction A, although embodiments of the disclosure are not so limited. Thus, the following description can apply similarly to the second corner of the first module end 12 and to both corners of the second module end 14.

Figure 5:
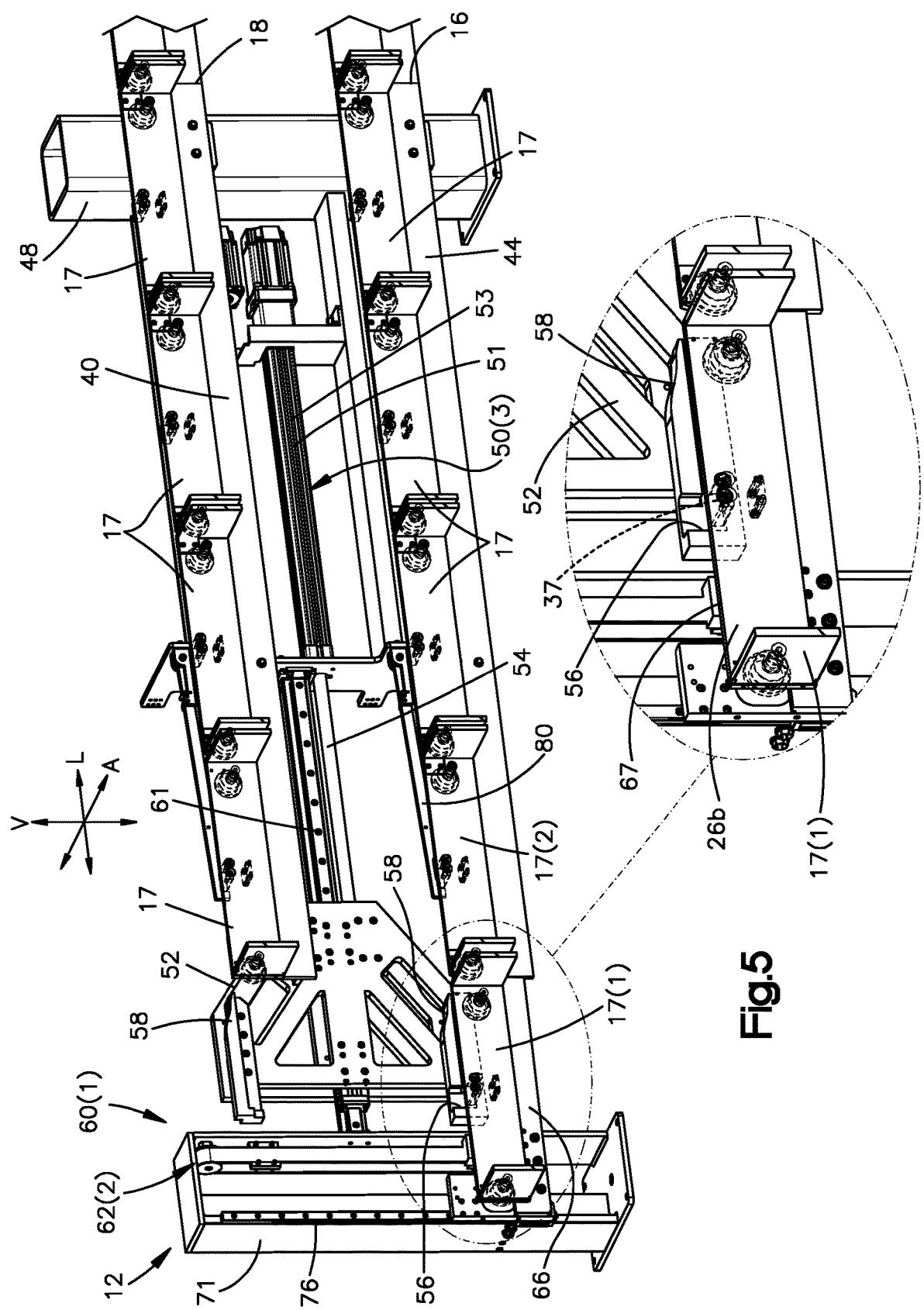
FIG. 5 shows an enlarged cross-sectional perspective view of one corner of the storage module of FIG. 1 according to one embodiment that includes a movement system in a first position and a vertical lift in a lowered position and showing a portion of the container carriers.

With specific reference to FIG. 5, each movement system can include an actuator 51 and a catch 52 that is coupled to the actuator 51. The actuator 51 is configured to move the catch 52 inwardly (e.g., towards a center of the storage module 10) along the longitudinal direction L such that the catch 52 engages a container carrier 17 at a select one of the first and second module ends 12 and 14 and moves the container carrier 17 towards the other one of the first and second module ends 12 and 14. The actuator 51 can also be configured to move the catch 52 outwardly (e.g., away from a center of the storage module 10) along the longitudinal direction L so that the catch 52 can engage a subsequent container carrier 17 at a select one of the first and second module ends 12 and 14. Thus, the actuator 51 is configured to move the catch 52 back and forth along the longitudinal direction L. The actuator 51 can be any suitable actuator for moving the catch 52. For example, in one embodiment as shown in FIG. 5, the actuator 51 can be any suitable linear actuator, such as (without limitation) a motor driven, pneumatic, or hydraulic actuator, that includes an actuator housing 53 and a piston rod 54. The catch 52 can be coupled to an end of the piston rod 54. The piston rod 54 can be configured to extend from and retract into the housing 53 along the longitudinal direction L so as to move the catch 52 along the longitudinal direction L.

Each movement system can include a rail 61 that extends along the longitudinal direction L. The rail 61 can be a linear bearing rail. The catch 52 can be coupled to the rail 61 and configured to ride along the rail 61 along the longitudinal direction L. Use of the rail 61 can limit the torque placed by the catch 52 on the actuator 51 and can maintain alignment of each carrier engagement surface 56 of the catch 52 with one of the first and second conveyor segments 16 and 18 along the longitudinal direction L.

The catch 52 can carry a first carrier engagement surface 56 that is aligned with one of the first and second conveyor segments 16 and 18 along the longitudinal direction L. The first carrier engagement surface 56 is configured to engage a container carrier 17 so as to push the container carrier 17 along the longitudinal direction L. For example, the first carrier engagement surface 56 can be positioned so as to engage and push container carriers 17 from a respective one of the first and second vertical lifts 60(1) and 60(2) onto the upper conveyor segment 16 in a first longitudinal direction when the storage module 10 operates in a first rotational direction (e.g., clockwise or counter clockwise). The first carrier engagement surface 56 can be configured to engage an actuator engagement feature 37 of a container carrier 17. The first engagement surface 56 can extend along the vertical direction V and lateral direction A, and can face inwardly.

The catch 52 can carry a second carrier engagement surface 56 that is aligned with the other one of the first and second conveyor segments 16 and 18 along the longitudinal direction L. The first and second carrier engagement surfaces 56 can be spaced from one another along the vertical direction V. The second carrier engagement surface 56 is configured to engage a container carrier 17 so as to push the container carrier 17 along the longitudinal direction L. For example, the second carrier engagement surface 56 can be positioned so as to engage and push container carriers 17 from the respective one of the first and second vertical lifts 60(1) and 60(2) onto along the lower conveyor segment 18 in the first longitudinal direction when the storage module 10 operates in a second rotational direction, opposite the first rotational direction. The second carrier engagement surface 56 can be configured to engage an actuator engagement feature 37 of a container carrier 17. The second engagement surface 56 can extend along the vertical direction V and lateral direction A, and can face inwardly. It will be understood that, in embodiments in which the storage module 10 operates in a unidirectional manner, the catch 52 can be implemented with just one of the first and second carrier engagement surfaces 56 so as to push container carriers 17 towards the second end 14 along only one of the first and second conveyor segments 16 and 18.

The catch 52 can be implemented as a plate that is attached to the end of the piston rod 54. The plate can include a plate body and at least one carrier engagement surface 56 can be attached to, or otherwise supported by, the plate body. In other embodiments, the at least one carrier engagement surface 56 can be integral to the plate. In yet other embodiments, the catch 52 can be implemented using structure other than the plate, such as a rod or block, that includes at least one carrier engagement surface 56. It will be understood that in alternative embodiments, each movement system 50 can include a pair of carrier engagement surfaces that are each controlled by their own actuator 51, rather than a shared actuator 51. Thus, each movement system can include a pair of actuators 51 offset from one another along the vertical direction V (one for each of the first and second conveyor segments 16 and 18), and each of the actuators can be coupled to a different carrier engagement surface 56.

Figure 9:
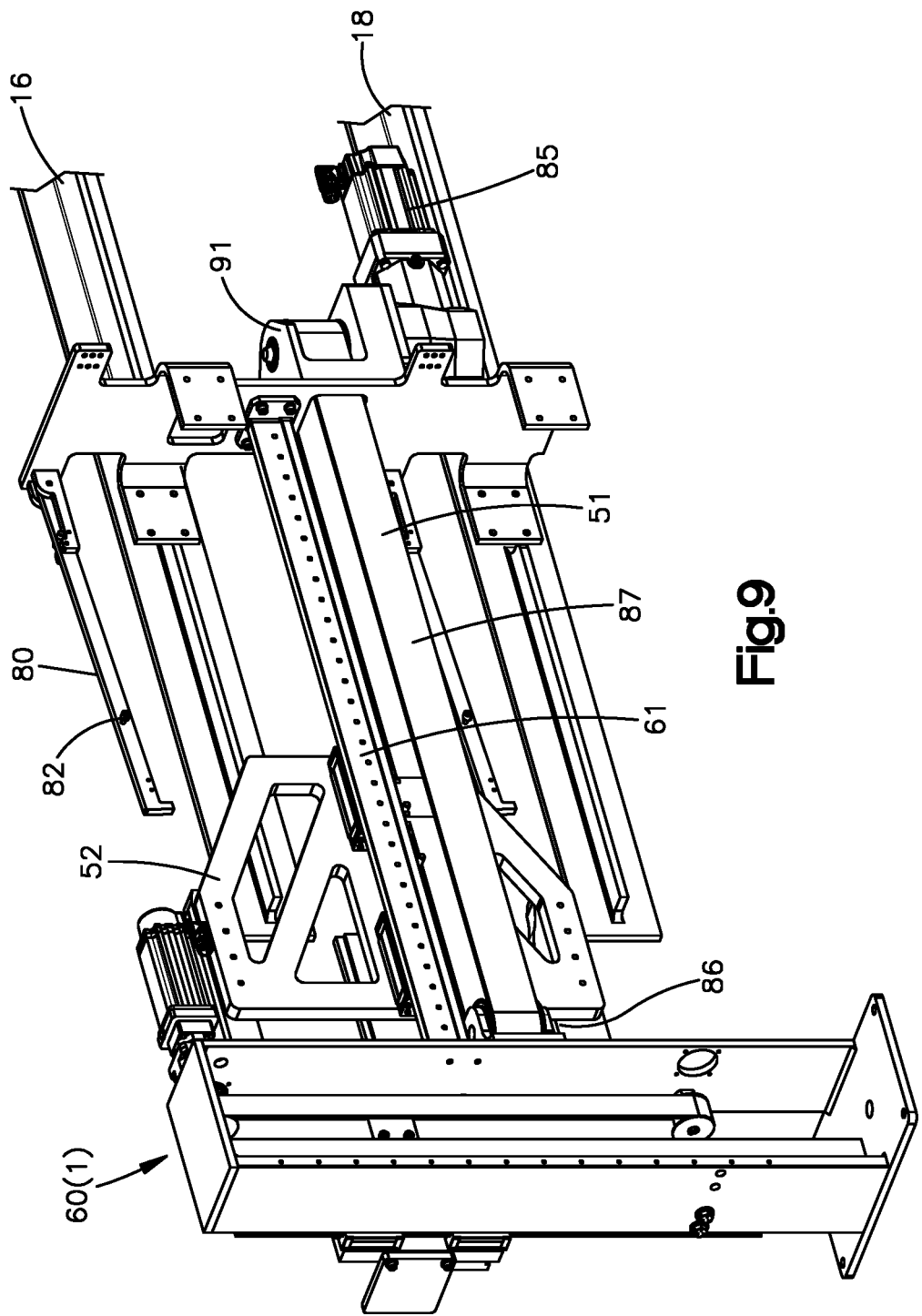
FIG. 9 shows an enlarged perspective view of the corner of the storage module of FIG. 1 according to another embodiment that includes a belt-driven movement system and a vertical lift.

Turning briefly to FIG. 9, an alternative embodiment is shown in which the actuator 51 is a belt- or chain-driven actuator that includes a drive 85 such as a motor, a pair of pulleys or gears 86 and a belt or chain 87. The pulleys or gears 86 can be positionally fixed and can be spaced apart from one another along the longitudinal direction L. The belt or chain 87 can define a closed loop that wraps around the pair of pulleys or gears 86. The catch 52 can be fastened or otherwise coupled to the belt or chain 87 between the pair of pulleys or gears 86 with respect to the longitudinal direction L. The catch 52 can include the at least one carrier engagement surface 56 configured as described above.

The drive 85 can be configured to cause the catch 52 to translate back and forth along the longitudinal direction L. For example, the drive 85 can be configured to rotate one of the pulleys or gears 86 in a first rotational direction so as to cause the belt or chain 87 to rotate around the pair of pulleys or gears 86 and the catch 52 to translate along a first longitudinal direction towards one of the pulleys or gears 86. The drive 85 can further be configured to rotate the one of the pulleys or gears 86 in a second rotational direction, opposite the first rotational direction, so as to cause the catch 52 to translate along a second longitudinal direction L, opposite the first longitudinal direction, towards the other one of the pulleys or gears 86.

Figure 10:
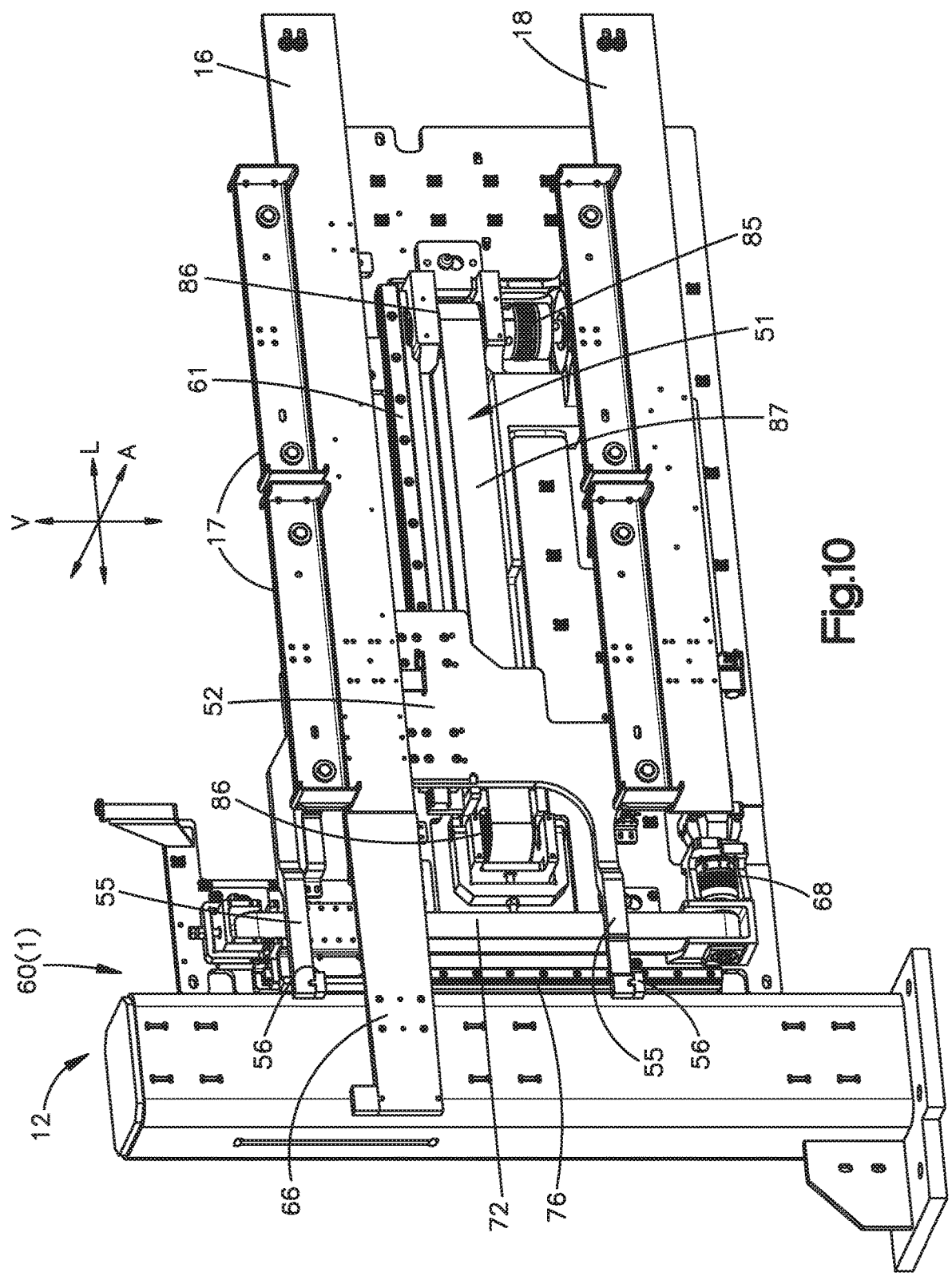
FIG. 10 shows an enlarged perspective view of the corner of the storage module of FIG. 1 according to yet another embodiment that includes a movement system with an alternative catch.

FIG. 10 shows a yet another embodiment in which the catch 52 is implemented as a plate. However, the shape of the catch 52 in FIG. 10 differs from the shape of the plates shown in FIGS. 5 and 9. Like the catch 52 in FIGS. 5 and 9, the catch 52 has at least one carrier engagement surface 56 that is configured to engage container carriers 17 so as push the container carriers along the longitudinal direction L. The catch 52 can be translated back and forth along the longitudinal direction L by any suitable actuator such as a linear actuator or belt- or chain-driven actuator as described above.

The catch 52 in FIG. 10 has a first and second arms 55 that are spaced from one another along the vertical direction V. The first arm 55 carries a first carrier engagement surface 56 such that the first carrier engagement surface 56 is aligned with container carriers 17 on the first conveyor segment 16, and the second arm carriers a second carrier engagement surface 56 such that the second carrier engagement surface 56 is aligned with container carriers 17 on the second conveyor segment 18. It will be understood that, in alternative embodiments, the catch 52 can include only a single carrier engagement surface 56 that engages carriers on one of the first and second conveyor segments 16 and 18. Further, the catch 52 can have shapes other than that shown.

Vertical Lifts

Referring back to FIG. 2, each vertical lift 60(1) and 60(2) is configured to transfer container carriers 17 between the upper and lower conveyor segments 16 and 18. In so doing, each vertical lift 60(1) and 60(2) can be configured to be moved between a lowered position, wherein the vertical lift is vertically aligned with the lower conveyor segment 16, and a raised position, wherein the vertical lift is vertically aligned with the upper conveyor segment 18. Each vertical lift 60(1) and 60(2) can be configured to operate in a unidirectional manner to transfer container carriers 17 from one of the upper and lower conveyor segments 16 and 18 to the other one of the upper and lower conveyor segments 16 and 18. Alternatively, each vertical lift 60(1) and 60(2) can be configured to operate in a bidirectional manner to transfer container carriers 17 from the upper conveyor segment 16 to the lower conveyor segment 18 and from the lower conveyor segment 18 to the upper conveyor segment 16.

The first vertical lift 60(1) is configured to transfer container carriers 17 between the first end 16a of the first conveyor segment 16 and the first end 18a of the second conveyor segment 18. For instance, the first vertical lift 60(1) transfers container carriers 17 from the first end 16a of the first conveyor segment 16 to the first end 18a of the second conveyor segment 18 when the storage module 10 operates in the counterclockwise direction, and from the first end 18a of the second conveyor segment 18 to the first end 16a of the first conveyor segment 16 when the storage module 10 operates in the clockwise direction. The first vertical lift 60(1) can be configured to move at least one container carrier 17 at a time; however, in alternative embodiments, the first vertical lift 60(1) can be configured to move more than one carrier 17 at a time. When the first vertical lift 60(1) moves the at least one container carrier between the first and second conveyor segments 16 and 18, at least some, up to all, of the container carriers on the first and second conveyor segments 16 and 18 can remain stationary. In other words, the storage module 10 can be configured such that at least some of the container carriers 17, and hence the storage containers 15, remain stationary while the first vertical lift 60(1) moves at least one container carrier 17 between the first and second conveyor segments 16 and 18. The first vertical lift 60(1) is configured to move in a direction opposite the movement path to receive each container carrier 17, and then move the container carrier 17 along the movement path.

Similarly, the second vertical lift 60(2) is configured to transfer container carriers 17, and hence storage containers 15, between the second end 16b of the first conveyor segment 16 and the second end 18b of the second conveyor segment 18. For instance, the second vertical lift 60(2)

transfers container carriers 17 from the second end 16b of the first conveyor segment 16 to the second end 18b of the second conveyor segment 18 when the storage module 10 operates in the clockwise direction, and from the second end 18b of the second conveyor segment 18 to the second end 16b of the first conveyor segment 16 when the storage module 10 operates in the counterclockwise direction. The second vertical lift 60(2) can be configured to move at least one container carrier 17 at a time; however, in alternative embodiments, the second vertical lift 60(2) can be configured to move more than one carrier 17 at a time. When the second vertical lift 60(2) moves the at least one container carrier between the first and second conveyor segments 16 and 18, at least one, up to all, of the container carriers 17 on the first and second conveyor segments 16 and 18 can remain stationary. In other words, the storage module 10 can be configured such that at least some of the container carriers 17, and hence the storage containers 15, remain stationary while the second vertical lift 60(2) moves at least one container carrier 17 between the first and second conveyor segments 16 and 18. The second vertical lift 60(2) is configured to move in a direction opposite the movement path to receive each container carrier 17, and then move the container carrier 17 along the movement path.

Each vertical lift 60(1) and 60(2) includes at least one lift actuator system that is configured to move container carriers 17 between the lowered and raised positions. In some embodiments, each vertical lift 60(1) and 60(2) can include a first lift actuator system 62(1) and a second lift actuator system 62(2) that are spaced from one another along the lateral direction A. The first and second lift actuator systems 62(1) and 62(2) can be configured to operate together to move container carriers 17 between the lowered and raised positions.

Each vertical lift 60(1) and 60(2) can include at least one conveyor surface 67 that is configured to support container carriers 17 thereon. Each vertical lift 60(1) and 60(2) can be configured to move its respective at least one conveyor surface 67 between the lowered and raised positions. In the embodiment shown, the at least one conveyor surface 67 is defined by tracks 66. However, it will be understood that, in alternative embodiments, the at least one conveyor surface can be implemented using any suitable conveyor elements such as tracks, belts, rollers, skate wheels, balls, any other suitable conveyor elements for translating the container carriers 17, or any suitable combination of conveyor elements. Each vertical lift 60(1) and 60(2) can be configured to support its at least one storage container 15 such that an open top of each of the at least one storage container 15 is open to an area above the vertical lift 60(1) and 60(2). For example, each vertical lift 60(1) and 60(2) can be configured to support its at least one storage container 15 such that the vertical lift 60(1) or 60(2) does not obstruct the open top of each of its at least one storage container 15. Thus, each vertical lift 60(1) and 60(2) can be said to have an open top.

Figure 6:
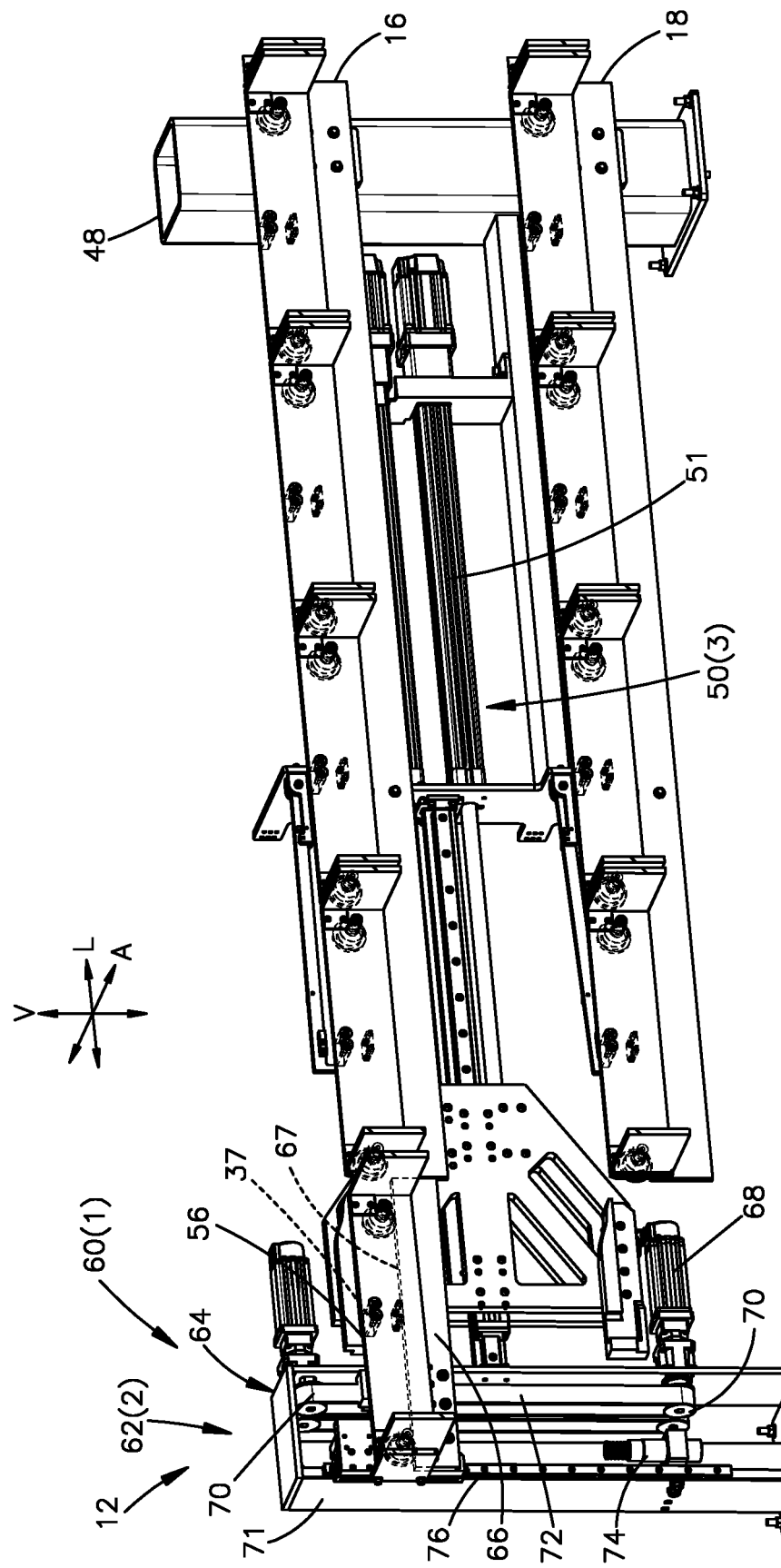
FIG. 6 shows an enlarged cross-sectional perspective view of the corner of FIG. 5 with the movement system in the first actuated position and the vertical lift in a raised position.

With reference to FIG. 6, each lift actuator system 62(1) and 62(2) can include an actuator 64 and a track 66 that is coupled to the actuator 64. The actuator 64 is configured to raise the track 66 to a raised position where the track 66 is aligned with one of the upper tracks of the upper conveyor segment 16. The actuator 64 is further configured to lower the track 66 to a lowered position where the track 66 is aligned with one of the lower tracks of the lower conveyor segment 18. The track 66 includes an upper track surface 67 that is configured to support wheels 34 of the container carriers 17. The container carriers 17 are sized and positioned such that their respective wheels 34 roll along the upper track surface 67 of the track 66. Optionally, the upper track surface 67 can be ramped downward as it extends away from a center of the storage module 10 so as to prevent a container carrier 17 on the track 67 from rolling from vertical lift towards the upper and lower conveyor segments 16 and 18 as the vertical lift is moving between the raised and lowered positions. The ramped surface 67 can further be used to create separation between a container carrier 17 received on the ramped surface 67 and the container carriers 17 that are disposed on the upper and lower conveyor segments 16 and 18.

The actuator 64 can include a belt- or chain-driven actuator that includes a drive 68 such as a motor, a pair of pulleys or gears 70, and a belt or chain 72. Note that, in alternative embodiments, each actuator 64 can be any other suitable actuator such as a linear actuator described above in relation to the movement systems 50(1) to 50(4). The storage module 10 can further include a support 71 that supports the actuator 64. The pulleys or gears 70 can be positionally fixed and can be spaced apart from one another along the vertical direction V. The belt or chain 72 can define a closed loop that wraps around the pair of pulleys or gears 70. The track 66 can be fastened to the belt or chain 72. For example, the track 66 can be fastened to the belt or chain 72 between the pair of pulleys or gears 70 with respect to the vertical direction V.

The drive 68 can be configured to cause the track 66 to translate up and down along the vertical direction V. For example, the drive 68 can be configured to rotate one of the pulleys or gears 70 in a first rotational direction so as to cause the belt or chain 72 to rotate around the pair of pulleys or gears 70 and the track 66 to translate along a first vertical direction towards one of the pulleys or gears 70. The drive 68 can further be configured to rotate the one of the pulleys or gears 70 in a second rotational direction, opposite the first rotational direction, so as to cause the track 66 to translate along a second vertical direction, opposite the first vertical direction, towards the other one of the pulleys or gears 70.

Each lift actuator system 62(1) and 62(2) can include a rail 76 that extends along the vertical direction V. The rail 76 can be a linear bearing rail. The rail 76 can be supported by the support 71. The track 66 can be configured to ride up and down the rail 76 along the vertical direction V as the track moves between the raised and lowered positions. The track 66 can be coupled to the rail 76. For example, an outermost end of the track 66 can be coupled to the rail 76 such that the track 66 is cantilevered inwardly towards a center of the storage module 10. The track 66 can be coupled to the belt or chain 72 between the outermost end of the track 66 and an innermost end of the track 66. For instance, the track 66 can be coupled to the belt or chain 72 at a location that is spaced from the outermost end of the track 66 along the longitudinal direction L. Use of the rail 76 can limit the amount of torque placed by the track 66 on the belt or chain 72 and can maintain the track 66 in an upright orientation such that the track 66 can be aligned with the upper and lower conveyor segments 16 and 18.

Each lift actuator system 62(1) and 62(2) can optionally include a stop 74 disposed below the track 66. The stop 74 can be configured to obstruct descent of the track 66 in the event of a failure of the actuator 64 such as a belt failure. The stop 74 can be implemented as a force-dampening stop, as a cushion, a spring-loaded plunger, an acceleration plunger, or any other suitable force-dampening device that dampens force applied along the downward direction.

In FIGS. 5 to 8, an upper track 40, a lower track 44, a lift actuator system 62(2), a movement system 50(1), and a pair of vertically spaced hooks 80 are shown as being supported by supports 48 and 71 on an inner side of the storage module 10. As shown, the supports 48 and 71 can support another upper track, another lower track, another lift actuator system, another movement system, and another pair of vertically spaced hooks on an outer side of the storage module 10. The other upper track, lower track, lift actuator system, movement system, and pair of vertically spaced hooks can be used by a neighboring storage module that is adjacent to the storage module 10. Thus, the storage module 10 and the neighboring storage module can share the supports 48 and 71. Sharing supports 48 and 71 can decrease the space between neighboring storage modules, thereby increasing the amount of space that can be used for storage.

Movable Container Stops

Figure 7:
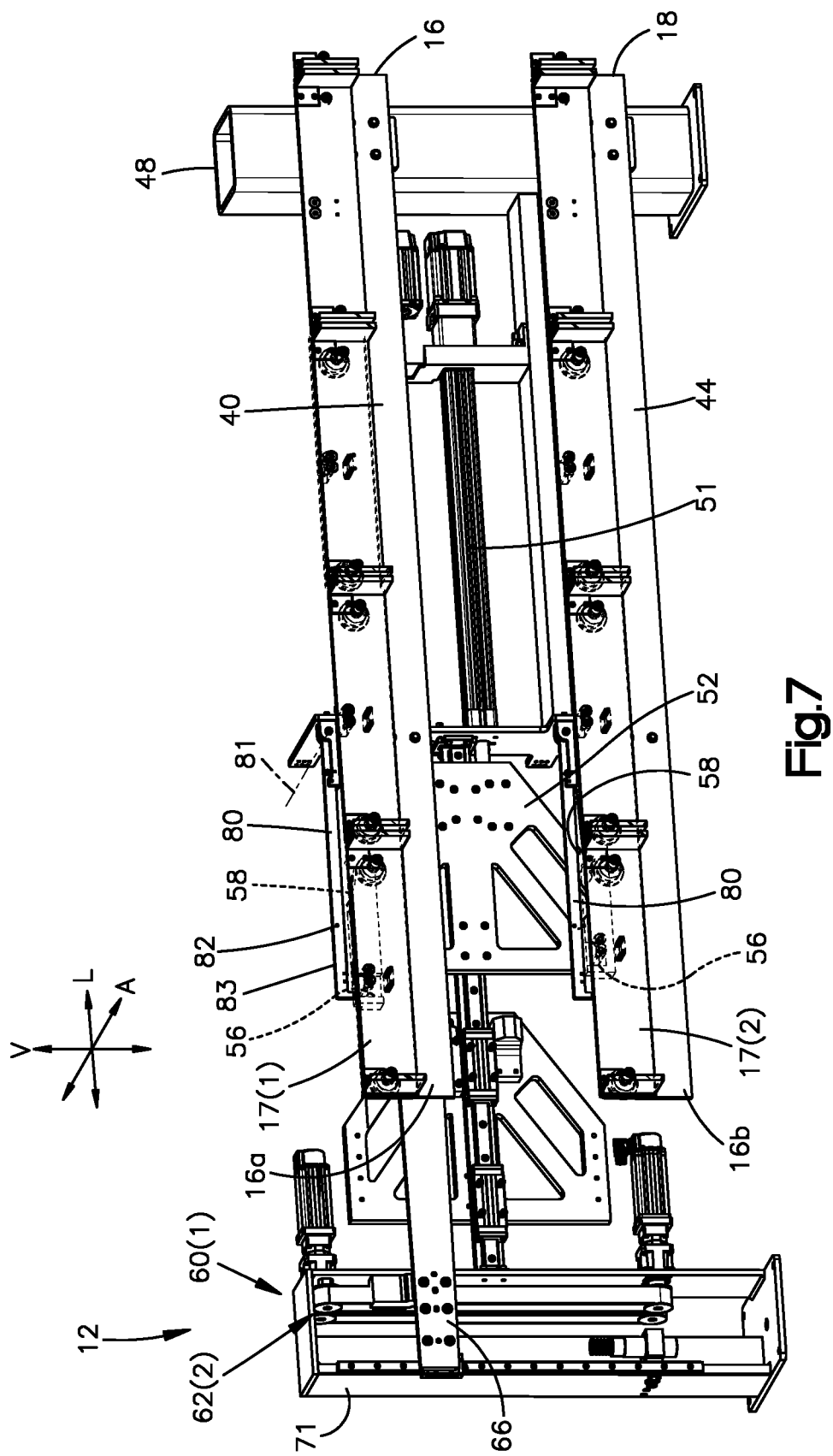
FIG. 7 shows an enlarged cross-sectional perspective view of the corner of FIG. 5 with the movement system in a second position and the vertical lift in the raised position.

With reference to FIG. 7, the storage module 10 can include at least one movable container stop 80 that can be selectively moved between an interference position and a released position. In the interference position, the movable container stop 80 interferes with a container carrier 17 on at least one of the first and second conveyor segments 16 and 18 so as to prevent the container carrier 17 from moving outwardly along the longitudinal direction L onto one of the third and fourth conveyor segments 20 and 22. For example, the movable container stop 80 can prevent a container carrier 17 from moving outwardly when the vertical lift track 66 is not aligned with the one of the first and second conveyor segments 16 and 18. Thus, the movable container stop 80 can prevent a container carrier 17 from moving beyond an end (16a, 16b, 18a, or 18b) of the one of the first and second conveyor segments 16 and 18 so as to prevent the container carrier 17 from falling off of the segment end. In the released position, the interference can be removed so as to permit a container carrier 17 to move outwardly along the longitudinal direction L and onto one of the first and second vertical lifts 60(1) and 60(2).

In some examples, the storage module 10 can include a plurality of movable container stops 80 that are configured to selectively interfere with outward movement of the container carriers 17. For example, the storage module 10 can include at least one upper movable container stop 80 at the first end 16a of the first conveyor segment 16, such as a pair of upper movable container stops 80 at the first end 16a that are offset from one another along the lateral direction A. The storage module 10 can include at least one of lower movable container stop 80 at the first end 18a of the second conveyor segment 18, such as a pair of lower movable container stops 80 at the first end 16a that are offset from one another along the lateral direction A. The storage module 10 can include at least one upper movable container stop 80 at the second end 16b of the first conveyor segment 16, such as a pair of upper movable container stops 80 at the second end 16b that are offset from one another along the lateral direction A. The storage module 10 can include at least one lower movable container stop 80 at the second end 18b of the second conveyor segment 18, such as a pair of lower movable container stops 80 at the second end 16b that are offset from one another along the lateral direction A.

FIG. 7 shows an embodiment in which each movable stop 80 comprises a pivoting hook 83 that is configured to rotate between the interference and released positions. Each movable stop 80 can be configured to pivot about a pivot axis 81 that extends along the lateral direction A. To support pivoting, each catch 52 can include a guide surface 58 (see enlarged view of FIG. 5) for each movable stop 80. For example, each catch 52 can include a pair of guide surfaces 58 that are spaced from one another along the vertical direction V, one for an upper movable stop 80 and one for a lower movable stop 80. Each guide surface 58 can be ramped so as to be angled upwards as the guide surface extends outwardly away from a center of the storage module 10. Further, each movable stop 80 can have an engagement surface 82 that rides along a corresponding one of the guide surfaces 58 to raise and lower the movable stop 80 between the released and interference positions, respectively. For instance, the engagement surface 82 can ride up a corresponding one of the guide surfaces 58 so as to raise the movable stop 80 to the released position, and ride down the corresponding one of the guide surfaces 58 so as to lower the movable stop 80 to the interference position. In one embodiment, the engagement surface 82 can be the outer surface of a pin or wheel that extends from a body of the hook along the lateral direction A. In the interference position, the movable stop 80 can act as a stop that engages a respective actuator engagement feature 37 of one of the container carriers 17 so as to provide an interference with the actuator engagement feature 37 that prevents the container carrier 17 from moving outwardly.

Referring to FIGS. 11 to 13, an alternative embodiment of a movable stop 80 is shown. The movable stop 80 comprises a translating block 84 that is configured to translate along the vertical direction V between the interference position in FIG. 11 and the released position in FIG. 13. To support translating, each catch 52 can include at least one guide surface 85 for the movable stop 80, such as a pair of guide surfaces 85 that are spaced from one another along the vertical direction V. Each guide surface 85 can be ramped so as to be angled upwards as the guide surface extends inwardly towards a center of the storage module 10. Further, each movable stop 80 can have an engagement surface 88 that rides along a corresponding one of the guide surfaces 85 to raise and lower the movable stop 80 between the released and interference positions, respectively. For instance, as shown in FIGS. 11 to 13, the engagement surface 88 of the stop 80 can ride down a corresponding one of the guide surfaces 85 of the catch 52 as the catch 52 translates inwards so as to lower the movable stop 80 from the interference position to the released position. Further, the engagement surface 88 of the stop 80 can ride up the corresponding one of the guide surfaces 85 of the catch (e.g., from FIG. 13 to FIG. 11) so as to raise the movable stop 80 from the released position to the interference position. In one embodiment, the engagement surface 88 can be the outer surface of a pin or wheel that extends from a body of the block along the lateral direction A. In the interference position, the movable stop 80 can act as a stop that engages a respective actuator engagement feature 37 of one of the container carriers 17 so as to provide an interference with the actuator engagement feature 37 that prevents the container carrier 17 from moving outwardly.

It will be understood that the movable stops 80 of FIG. 7 and FIGS. 11 to 13 can be implemented with any of the catches 52 and actuators described herein. Thus, the movable stop 80 in FIG. 7 is not limited to being used with the catch 52 and actuator 51 in FIG. 7. Similarly, the movable stop 80 in FIGS. 11 to 13 is not limited to being used with the catch 52 and actuator 51 in FIG. 10. Moreover, it will be understood that the movable stops 80 can be implemented in other suitable manners. For example, rather than use the guide surfaces 58 and 85 to move the movable stop 80 can include an actuator that moves the movable stop 80 between the interference and released positions. The actuator can be any suitable actuator such as (without limitation) a motor driven actuator, pneumatic actuator, or hydraulic actuator.

Method of Operating a Storage Module

Turning now to FIGS. 5 to 8, one method of transferring the container carriers 17 around the movement path 19 in a clockwise direction will be described. In the following discussion, the operation of the storage module 10 at the corner defined by the first module end 12 and the second module side 13 is described. It will be understood that the operation of the storage module 10 at the corner defined by the first module end 12 and the first module side 11 can be identical. In FIG. 5, the vertical lift 60(1) is in the lowered position and the movement system 50(3) is in a first position, which may also be referred to as an outward position. A first container carrier 17(1) is pushed from the lower conveyor segment 18 onto the vertical lift 60(1). In particular, the movement systems 50(2) and 50(4) at the second module end 14 (shown in FIG. 2), push a plurality of container carriers 17 along the lower conveyor segment 18, which in turn push the first container carrier 17(1) onto the vertical lift 60(1). A movable stop 80 moves to an interference position so as to engage a second container carrier 17(2) that is immediately upstream of the first container carrier 17(1) so as to prevent the second container carrier 17(2) from move outwardly into the path of the vertical lift 60(1).

Figure 8:
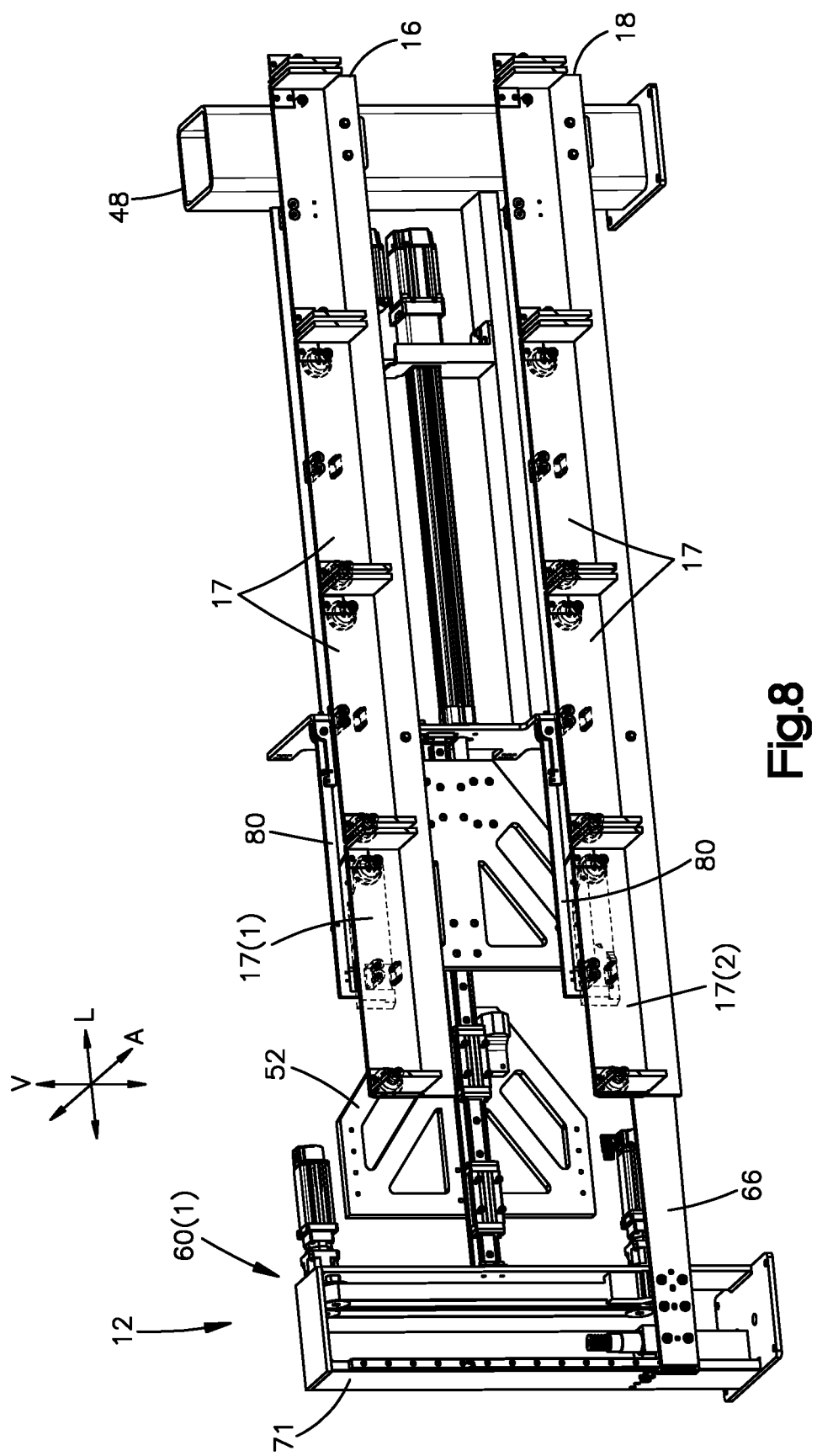
FIG. 8 shows an enlarged cross-sectional perspective view of the corner of FIG. 5 with the movement system in a second position and the vertical lift in the lowered position.

In FIG. 6, the vertical lift 60(1) moves the first container carrier 17(1) from the lowered position to the raised position. As the vertical lift 60(1) moves the first container carrier 17(1), at least some, up to all, of the container carriers 17 on the upper and lower conveyor segments 16 and 18 can remain stationary. In the raised position, the actuator engagement feature 37 of the first container carrier 17(1) is aligned with the upper carrier engagement surface 56 of the catch 52. In FIG. 7, the actuator 51 moves the catch 52 along the longitudinal direction L towards the second module end 14 from the first position to a second position, which may be referred to as an inward position, thereby causing the upper carrier engagement surface 56 to push the first container carrier 17(1) from the vertical lift 60(1) towards the second module end 14. Movement of the first container carrier 17(1) in turn pushes the downstream container carriers 17 on the upper conveyor segment 16 until one of the container carriers (not shown in FIG. 7) is transferred from the upper conveyor segment 16 onto the second vertical lift 60(2) (not shown in FIG. 7). Further, as the actuator 51 actuates and the catch 52 moves towards the second module end 14, the upper and lower movable stops 80 move from the interference position to the released position so as to disengage from the container carriers 17(1) and 17(2). In FIG. 8, the vertical lift 60(1) is returned from the raised position to the lowered position. As the vertical lift 60(1) is returned to the lowered position, at least some, up to all, of the container carriers 17 on the upper and lower conveyor segments 16 and 18 can remain stationary. The steps of FIGS. 5-8 can then be repeated to transfer the second container carrier 17(2) to the upper conveyor segment 16.

It will be noted that the second module end 14 operates in a similar manner such that the second vertical lift 60(2) transfers container carriers 17 from the upper conveyor segment 16 to the lower conveyor segment 18. It will be understood that the process can also be reversed such that the first vertical lift 60(1) transfers container carriers 17 from the upper conveyor segment 16 to the lower conveyor segment 18, and the second vertical lift 60(2) transfers container carriers 17 from the lower conveyor segment 18 to the upper conveyor segment 16.

System of Storage Modules

The storage module 10 can be modular in the sense that the storage module can be fully functional on its own, and multiple instances of the storage module can be grouped together in clusters (e.g., a group of more than one stackable storage module). When grouped into clusters, each stackable storage module remains independently controllable. A cluster of stackable storage modules can be assembled in a fixed structure (e.g., in a warehouse to augment or replace vertical shelving units or other conventional storage means), in a mobile structure (e.g., a shipping container), and in other mobile and non-mobile arrangements. Use of clusters of stackable storage modules may enable increased flexibility with item storage.

Figure 14:
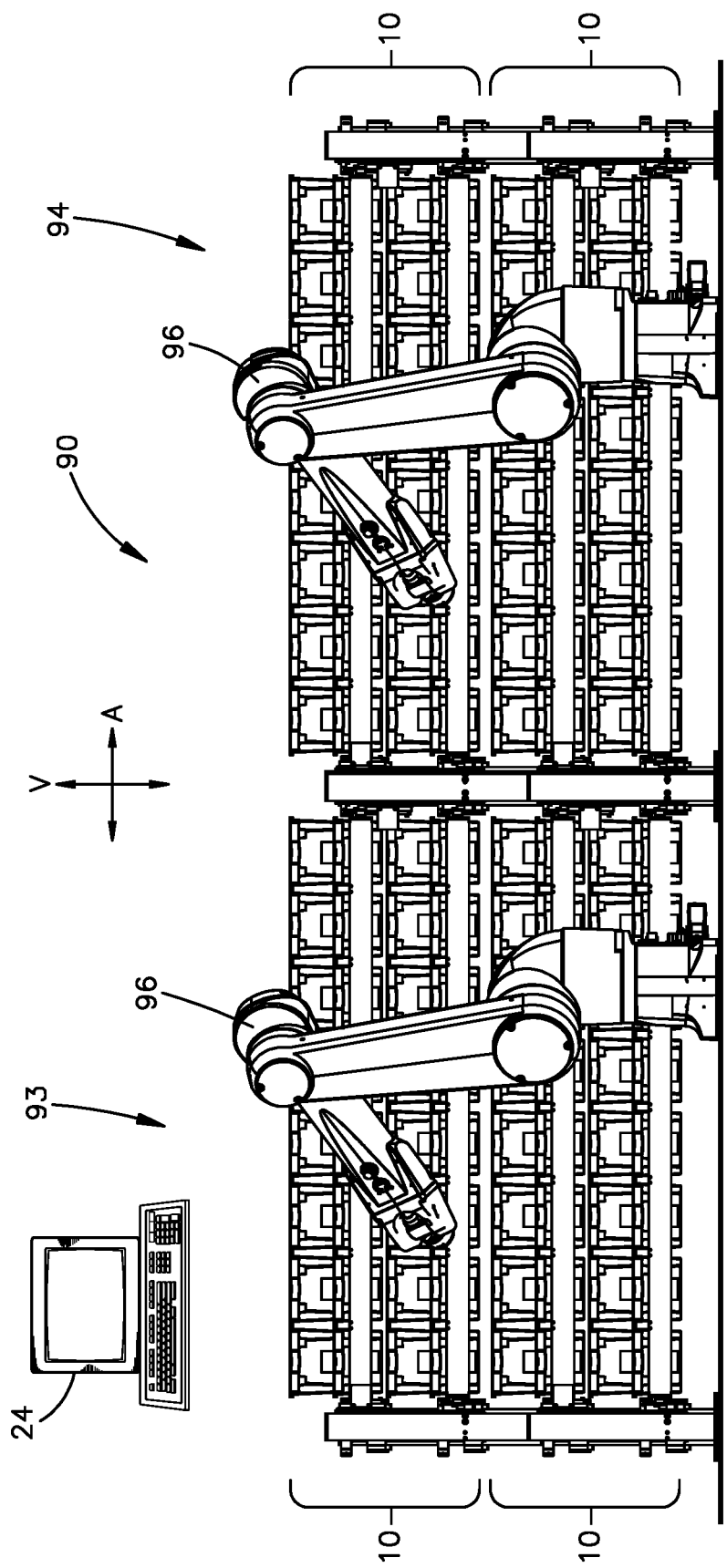
FIG. 14 shows an end view of a storage system according to one embodiment that comprises a plurality of instances of the storage module of FIG. 1.

A plurality of instances of the storage module 10 can be arranged in a cluster of storage modules in a modular storage and retrieval system as shown in FIG. 14. The system can include at least one vertical stack of the storage modules, where each vertical stack comprises at least two storage modules stacked on top of one another along the vertical direction V. In some embodiments, the modular storage and retrieval system can include a plurality of the vertical stacks of storage modules that are offset from one another along the lateral direction A. In the system, the storage modules can be independently operated such that the storage containers 15 of each storage module can be driven around their corresponding movement path independently of the storage containers 15 of other storage modules being driven around their corresponding movement path. Thus, the movement paths of each storage module can be independent from and unconnected to the movement paths of the other storage modules.

In FIG. 14, the modular storage and retrieval system 90 comprises a plurality of instances of the storage module 10 of FIG. 1, each supporting a plurality of storage containers 15. In at least some embodiments, the system 90 can include the storage containers 15 supported by the system 90, although it will be understood that each storage module 10, and hence the system 90, can be made and sold without the storage containers 15. The storage system 90 comprises a first system end 91, and a second system end that is spaced from the first system end 91 along the longitudinal direction L. Each of the storage modules 10 extends from the first system end 91 to the second system end. The plurality of storage modules 10 includes a first vertical stack 93 of storage modules 10 that comprises a plurality (e.g., at least two) of the storage modules 10 stacked on top of one another along the vertical direction V. The storage system 90 further includes a second vertical stack 94 of the storage modules 10 that comprises a plurality (e.g., at least two) of the storage modules 10 stacked on top of one another along the vertical direction V. The second vertical stack 94 can be offset from the first vertical stack 93 along the lateral direction A.

Each storage module 10 of the system 90 can be independently operated such that storage containers 15 of each storage module 10 can be driven around their corresponding movement path independently of the storage containers 15 of other storage modules 10 being driven around their corresponding movement path. Although two vertical stacks 93 and 94, each having two storage modules 10 are shown, it will be understood that the number of vertical stacks and the number of storage modules 10 in each vertical stack can vary from that shown. In particular, modular storage and retrieval systems of the disclosure can include at least one vertical stack of storage modules 10 or more than one vertical stack of storage modules 10. Further, each vertical stack of storage modules 10 can have at least two storage modules 10 stacked on top of one another or more than two storage modules 10. Thus, height, width, and length of the system 90 can be scalable to fit within a desired volume in a warehouse space.

The modular storage and retrieval storage system 90 can include supports 95 that are coupled to the conveyor segments in each storage module 10 in each vertical stack 93 and 94 so as to maintain the storage modules 10 in a stacked relation. The supports 95 can further be coupled to laterally adjacent storage modules 10 so as to attach the vertical stacks 93 and 94 of storage modules 90 to one another. The supports 95 can combine to form a frame of the system 90. Note that each support 95 can be formed by coupling or fastening the corresponding supports (see e.g., 48, 71 in FIG. 2) of vertically stacked storage modules 10 to one another, or by making the corresponding supports integral to one another.

The storage modules 10 can be stacked on top of one another so that the space between the storage containers 15 of each storage module 10 and a storage module 10 immediately over top of the storage module 10 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers 15, such as a spacing that is no more than 20 percent of the height of the storage container 15, such as no more than 15 percent of the height of the storage container 15, such as no more than 10 percent of the height of the storage container 15, or such as no more than 5 percent of the height of the storage container 15. Storage density is inversely proportional to the distance between the storage containers 15 of vertically adjacent storage modules 10. Thus, as this distance is decreased, the storage density increases.

The modular storage and retrieval system can include a robotic manipulator 96 that is configured to retrieve inventory items from the storage containers 15 and/or remove the storage containers 15 from the storage module. The robotic manipulator 96 can also be configured to place inventory items into the storage containers 15 and/or place storage containers 15 onto the storage module. The robotic manipulator 96 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). The robotic manipulator may include any suitable type and number of sensors disposed throughout the robotic manipulator (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator, including an end effector.

The sensors may be in communication with a management device that is local to the robotic manipulator (e.g., a robotic manipulator controller) and/or may be in direct communication with an item movement management system. In this manner, the management device may control the operation of the robotic manipulator and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

The at least one robotic manipulator 96 can service the first system end 91 of each storage module 10 in a vertical stack. The system 90 can additionally or alternatively include at least one robotic manipulator 96 that services the second system end 14 of each vertical stack of storage modules 10. In some embodiments, the manipulators 96 at the first system end 91 can be used to stow inventory items or storage containers 15 in the storage modules 10, and the manipulators 96 at the second system end can be used to retrieve inventory items or storage containers 15 from the storage modules 10. Alternative embodiments can include at least one manipulator 96 at only one end of a vertical stack, the at least one manipulator 96 configured to perform both stowing and retrieving operations.

Additionally or alternatively, one or more of the robotic manipulators 96 can service multiple vertical stacks of storage modules 10. Although not shown, in some embodiments, the at least one robotic manipulator 96 can be configured to move vertically and/or horizontally to service the storage modules 10 of the system 90. For example, a robotic manipulator 96 can be mounted on a horizontal and/or vertical track to enable it to move with respect to the vertical stacks.

In some examples, depending on the application for the robotic manipulator, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

Other material conveyance devices may also be disposed on each floor adjacent to the robotic manipulators. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices may be used to transport items and/or storage containers 15 to and from the robotic manipulators 96. In some examples, first other material conveyance devices transport items to the robotic manipulators 96 for placement in the storage containers of the stackable storage modules. Second other material conveyance devices may transport other items from the robotic manipulators (e.g., items that have been removed from the storage containers 15 of the stackable storage modules) to other locations within the facility (e.g., packaging, labeling, inspection, etc.).

Each modular storage and retrieval system (and the other modular storage and retrieval systems described herein) may include means for inspection, repairs, and removal of jams of the stackable storage modules. For example, a container carrier 17 may be adapted to support inspection or service equipment, e.g., a robotic manipulator configured to inspect the stackable storage modules, remove jams, and perform certain maintenance. As described herein, the vertical stacks may also be moveable to allow access to all of the stackable storage modules. Additionally or alternatively, movement system components such as motors and other components may be positioned near the first module end 12 and/or near the second module end 14 for ease of access for maintenance.

Method of Operating a System of Storage Modules

In operation, a method of operating the system 90 comprises causing a desired storage container 15 in the system 90 to be identified to either retrieve an inventory item from or stow an inventory item into. Further, the method comprises causing a location of the storage container 15 in the system 90 to be identified. Identifying the location can include identifying the storage module 10 and optionally the position of the storage container 15 on the identified storage module 10. Once the location is identified, the method comprises causing the container carriers 17, and hence the storage containers 15, of the identified storage module 10 to be translated around the movement path of the identified storage module 10 until the desired storage container 15 is presented at a desired one of the first and second ends 12 and 14 of the identified storage module 10. The translating steps can be performed in a manner similar to that described above in relation to FIGS. 5-8.

The method then comprises retrieving an inventory item from the desired storage container 15, or stowing an inventory item into the desired storage container 15. This step can be performed by a human who manually retrieves an inventory item from the desired storage container 15 or stows the inventory item into the desired storage container 15. Alternatively, this step can comprise causing a robotic manipulator 96 to move so as to retrieve an inventory item from the desired storage container 15, or stow an inventory item into the desired storage container 15. In some embodiments, the human or robotic manipulator 96 can retrieve the desired storage container 15 itself from the system 90, and then the inventory item can be retrieved from the desired storage container 15. The storage container 15 can then be stowed by the human or a robotic manipulator 96 onto a desired one of the storage modules 10. In so doing, the storage container 15 can be stowed onto the same storage module 10 from which the storage container 15 was retrieved or can be stowed in a different storage module. At least one, up to all, of these steps can be controlled by the controller 24.

End Effector

Referring to FIGS. 15 to 18, an end effector 100 is shown that can be implemented at an end of at least one of the robotic manipulators 96 in FIG. 14. The end effector 100 can be configured to pick up a pair of storage containers 15 that are stacked on top of one another along a first direction $D_1$ and separate the storage containers 15 from one another. The first direction $D_1$ can be a vertical direction when the end effector 100 is in the position shown in FIGS. 15 to 18. Additionally or alternatively, the end effector 100 can be configured to pick up the two storage containers 15 separately and stack the two storage containers 15 on top of one another. The storage containers 15 can be picked up from a container carrier 17, a shelf, a conveyor surface such as a conveyor belt, or from or another location. It will be understood that the position of the end effector 100 can vary depending on the position of the robotic manipulator to which it is attached. For ease of discussion, the end effector 100 will be described in a position in which it is configured to pick up or hold the storage containers 15 in an upright position as shown in FIGS. 15 to 18.

The end effector 100 has an upper container holder 102 configured to hold the upper storage container 15 of the stacked storage containers, and a lower container holder 104 configured to hold the lower storage container 15 of the stacked storage containers. The upper and lower container holders 102 and 104 are spaced from one another along the first direction $D_1$. The upper container holder 102 can include a first pair of arms 106 and 108 that are configured to engage opposing sides 15a and 15b or opposing ends 15c and 15d of the upper storage container 15. The pair of arms 106 and 108 can be spaced apart from one another along a second direction $D_2$, perpendicular to the first direction $D_1$. The second direction $D_2$ can be a lateral direction A when the end effector 100 is facing an end of the storage module 10. Each arm 106 and 108 can define a channel 110 that is configured to receive a lip of the upper storage container 15 that is defined on a respective one of the sides or ends. Each channel 110 can be elongate along a third direction $D_3$. The third direction $D_3$ can be perpendicular to the first and second directions $D_1$ and $D_2$. The third direction $D_3$ can be the longitudinal direction L when the end effector 100 is facing an end of the storage module 10. The upper container holder 102 can receive the upper storage container 15 by sliding the arms 106 and 108 along the sides or ends of the upper storage container 15 such that the lips on the sides or ends of the upper storage container 15 are received in the channels 110.

One or both of the arms 106 and 108 can be mounted onto at least one track 116 that is configured to selectively guide one or both of the arms 106 and 108 closer to one another and further from one another to accommodate differently sized storage containers 15. For example, each track 116 can extend along the lateral direction A and can be configured to selectively guide one of the arms 106 and 108 towards and away from the other one of the arms 106 and 108 along the lateral direction A. In some embodiments, the end effector 100 can include at least one actuator (not shown) that is configured to move at least one of the arms 106 and 108 towards and away from the other one of the arms 106 and 108. In alternative embodiments, the arms 106 and 108 can be positionally fixed relative to one another such that the arms 106 and 108 are not movable closer to, or away from, one another. The upper container holder 102 can include a protrusion 124 that engages a handle on one of the ends of the upper storage container 15. The protrusion 124 can extend behind the handle such as between a wall of the lower storage container 15 and the handle.

Similarly, the lower container holder 104 can include a second pair of arms 112 and 114 that are configured to engage opposing sides 15a and 15b or opposing ends 15c and 15d of the lower storage container 15. The pair of arms 112 and 114 can be spaced apart from one another along the second direction $D_2$. Each arm 112 and 114 can define a channel 110 that is configured to receive a lip of the lower storage container 15 that is defined on a respective one of the sides or ends. Each channel 110 can be elongate along the third direction $D_3$. The lower container holder 104 can receive the lower storage container 15 by sliding the arms 112 and 114 along the sides or ends of the lower storage container 15 such that the lips on the sides or ends of the lower storage container 15 are received in the channels 110.

One or both of the arms 112 and 114 can be mounted onto at least one track 118 that is configured to guide one or both of the arms 112 and 114 closer to one another or further from one another to accommodate differently sized storage containers 15. For example, each track 118 can extend along the lateral direction A and can be configured to guide a respective one of the arms 112 and 114 along the lateral direction A towards and away from the other one of the arms 112 and 114 along the lateral direction A. In some embodiments, the end effector 100 can include at least one actuator (not shown) that is configured to move at least one of the arms 112 and 114 towards and away from the other one of the arms 112 and 114. In alternative embodiments, the arms 112 and 114 can be positionally fixed relative to one another such that the arms 112 and 114 are not movable closer to, or away from, one another. The lower container holder 104 can include a protrusion 124 that engages a handle on one of the ends of the lower storage container 15. The protrusion 124 can extend behind the handle such as between a wall of the lower storage container 15 and the handle.

The end effector 100 can include at least one first linear actuator 120, such as a pair of first linear actuators 120 that are offset from one another along the third direction $D_3$. Each of the at least one first linear actuator 120 can be a linear servo actuator or any other suitable linear actuator. Each of the at least one first linear actuator 120 is coupled to the upper and lower container holders 102 and 104. Each of the at least one first linear actuators 120 can extend along the first direction $D_1$. The at least one first linear actuator 120 can be configured to move at least one of the upper and lower container holders 102 and 104 along the first direction $D_1$ relative to the other one of the upper and lower container holders 102 and 104. For example, the at least one first linear actuator 120 can be configured to move at least one of the upper and lower container holders 102 and 104 away from the other one of the upper and lower container holders 102 and 104 along the first direction $D_1$ to separate the upper and lower storage containers 15 from one another. Further, the at least one first linear actuator 120 can be configured to move at least one of the upper and lower container holders 102 and 104 towards the other one of the upper and lower container holders 102 and 104 along the first direction $D_1$ to stack the upper storage container 15 onto the lower storage container 15.

The end effector 100 can include at least one second linear actuator 122, such as a pair of second linear actuators 122 that are offset from one another along the third direction $D_3$. Each of the at least one second linear actuator 122 can be a linear servo actuator or any other suitable linear actuator. Each of the at least one second linear actuator 122 is coupled to the upper and lower container holders 102 and 104. Each of the at least one second linear actuator 122 can extend along the third direction $D_3$. Thus, the at least one second linear actuator 122 can be configured to move at least one of the upper and lower container holders 102 and 104 along the third direction $D_3$ relative to the other one of the upper and lower container holders 102 and 104. For example, the at least one second linear actuator 122 can be configured to move at least one of the upper and lower container holders 102 and 104 relative to the other one of the upper and lower container holders 102 and 104 along the third direction $D_3$ such that the upper storage container 15 is no longer aligned over the lower storage container 15. Further, the at least one second linear actuator 122 can be configured to move at least one of the upper and lower container holders 102 and 104 relative to the other one of the upper and lower container holders 102 and 104 along third direction $D_3$ so as to align the upper storage container 15 over the lower storage container 15.

Figure 15:
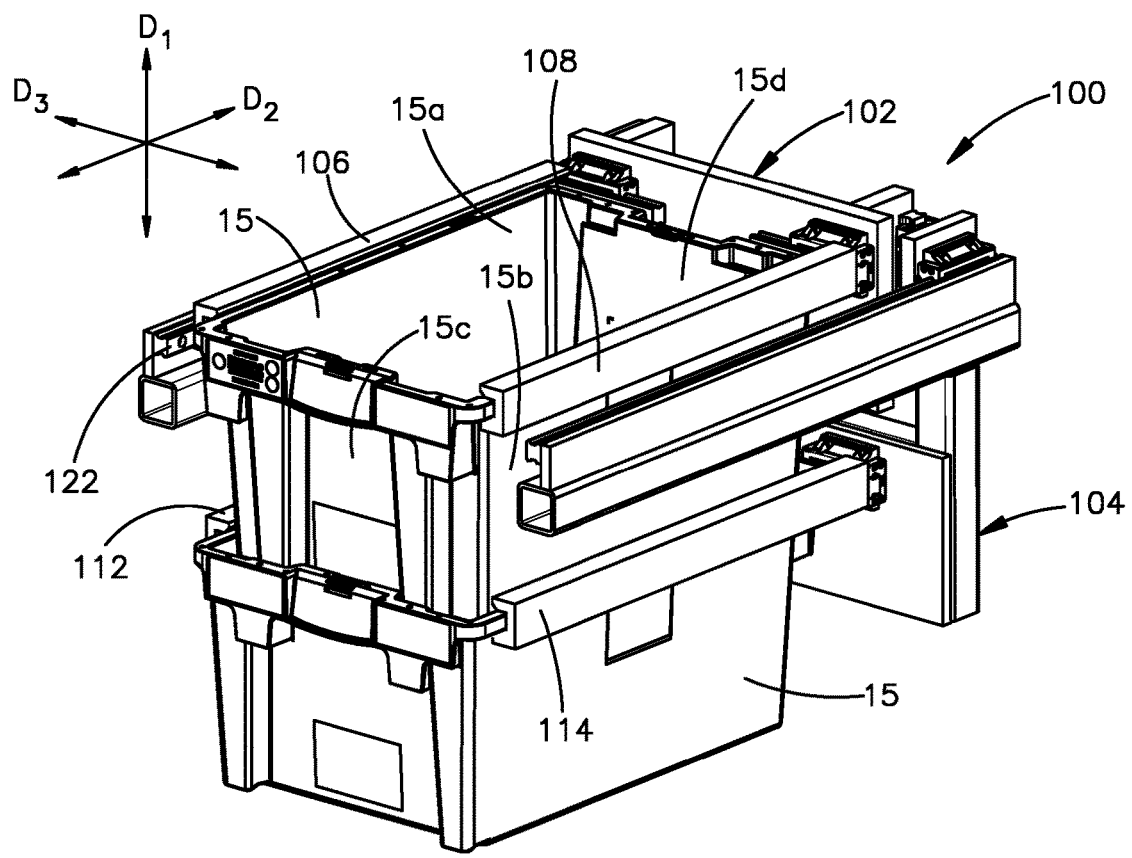
FIG. 15 shows a perspective view of an end effector according to one embodiment supporting an upper storage container stacked on a lower storage container.
Figure 16:
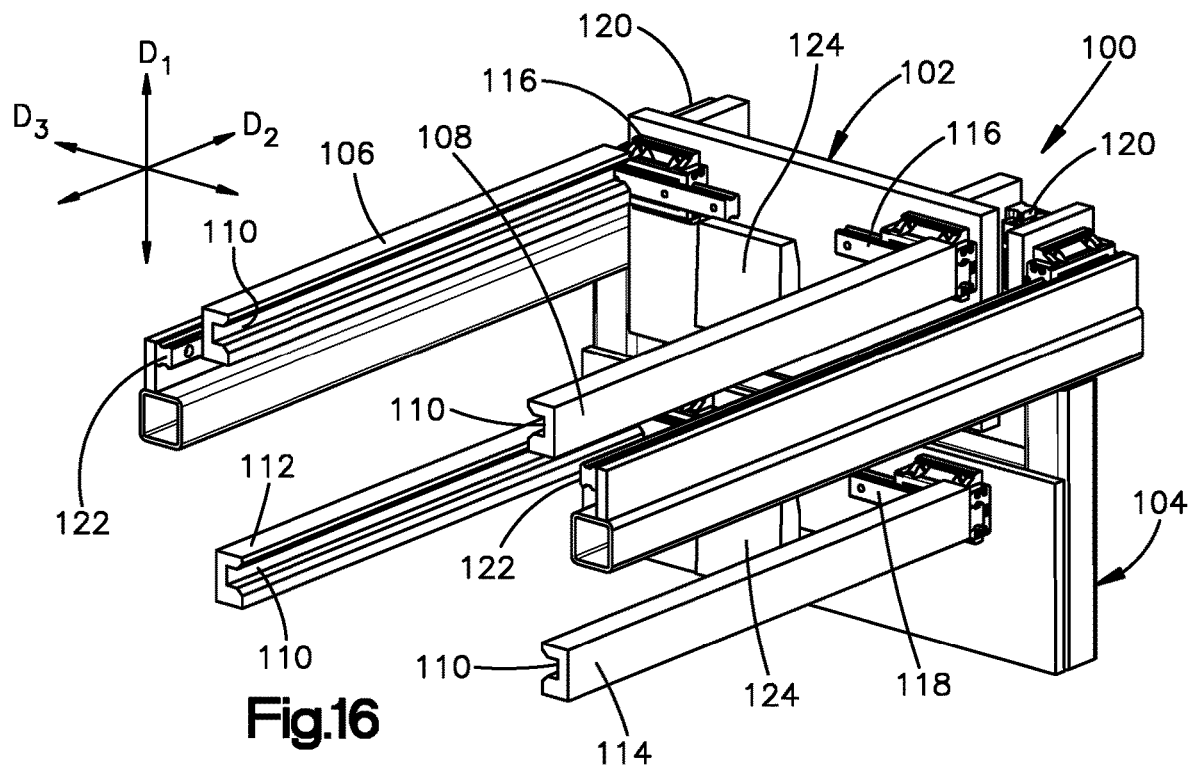
FIG. 16 shows a perspective view of the end effector of FIG. 15 without the storage containers.

In one embodiment, a method of decoupling upper and lower storage containers 15 that are stacked on top of one another comprises causing a robotic manipulator (e.g., 96 in FIG. 14) to move so as to align the end effector 100 with the upper and lower storage containers 15. The method comprises causing the robotic manipulator 96 to translate the end effector 100 along the second direction $D_2$ so as to couple to both the upper and lower storage containers 15. In particular, the method comprises causing the robotic manipulator 96 to translate such that a rim of a lower storage container 15 is slideably received in the channels 110 of the lower container holder 104, and a rim of an upper storage container 15 is slideably received in the channels 110 of the upper container holder 102 as shown in FIG. 15.

Figure 17:
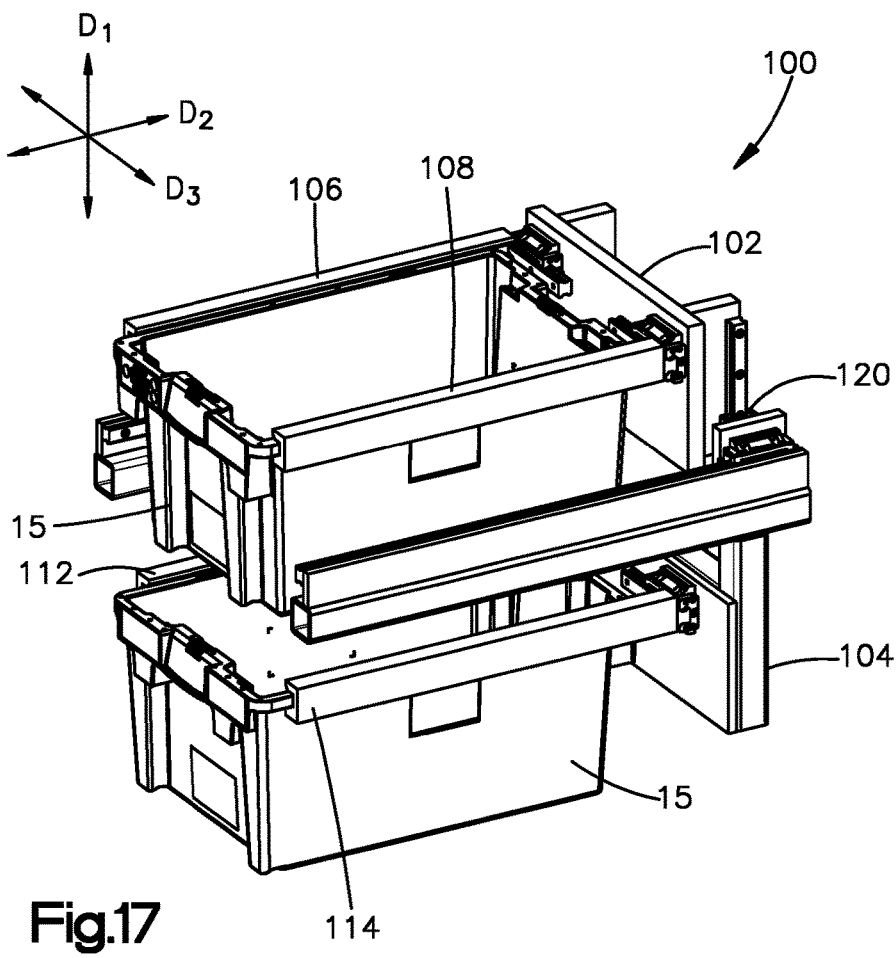
FIG. 17 shows a perspective view of the end effector of FIG. 15, where the end effector has separated the upper and lower storage containers from one another.
Figure 18:
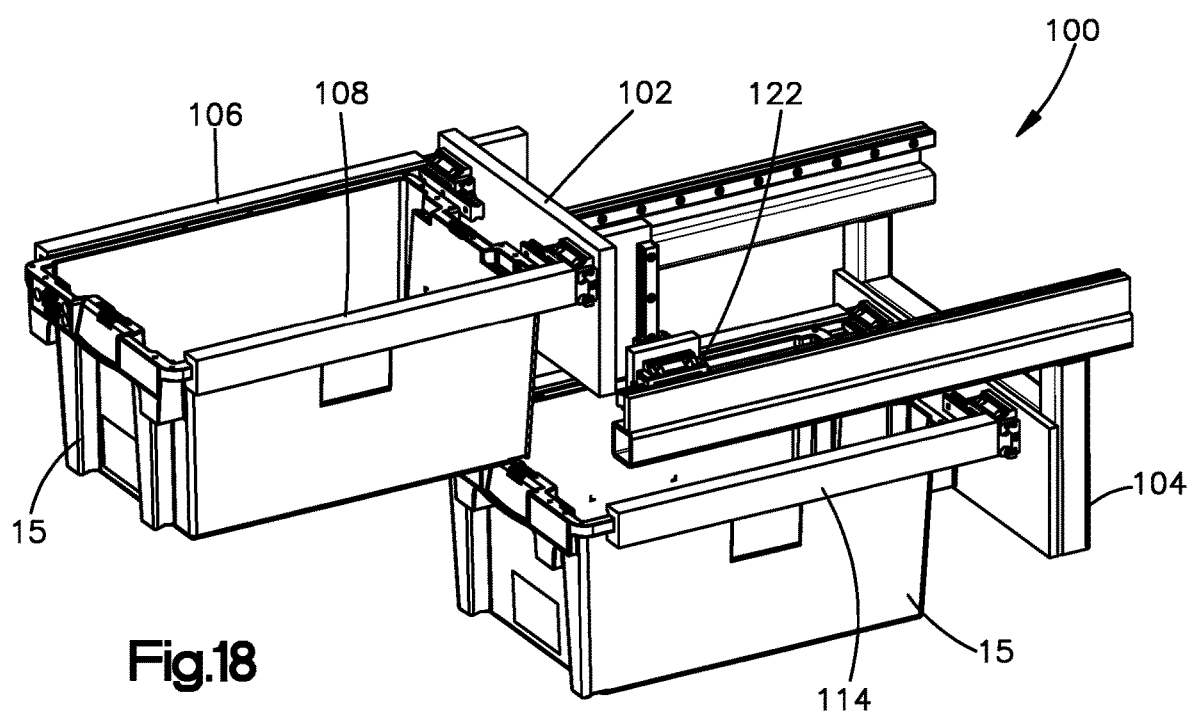
FIG. 18 shows a perspective view of the end effector of FIG. 15, where the end effector has moved the upper storage container outwards relative to the lower storage container.

The method comprises causing the at least one first linear actuator 120 to move at least one of the upper and lower container holders 102 and 104 away from the other along the first direction $D_1$ so as to separate the upper and lower storage containers 15 from one another along the first direction $D_1$ as shown in FIG. 17. The method comprises causing the at least one second linear actuator 122 to move at least one of the upper and lower container holders 102 and 104 outward along the second direction $D_2$ so as to separate the upper and lower storage containers 15 from one another with respect to the second direction $D_2$ as shown in FIG. 18.

The method comprises causing the robotic manipulator 96 to move to a first location such that the upper storage container 15 is supported at the first location, and causing the arms of the upper container holder 102 to translate along the second direction $D_2$ relative to the upper storage container 15 so as to decouple the upper container holder 102 from the upper storage container 15. Translating the arms of the upper container holder 102 can comprise causing the at least one second linear actuator 122 to move at least one of the upper and lower container holders 102 and 104 inwards along the second direction $D_2$, or causing the robotic manipulator 96 to move the upper container holder 102 away from the upper storage container 15 along the second direction $D_2$.

The method comprises causing the robotic manipulator 96 to move to a second location such that the lower storage container 15 is supported at the second location, and causing the arms of the lower container holder 104 to translate along the second direction $D_2$ relative to the lower storage container 15 so as to decouple the lower container holder 104 from the lower storage container 15. Translating the arms of the lower container holder 104 can comprise causing the robotic manipulator 96 to move the lower container holder 104 away from the upper storage container 15 along the second direction $D_2$. It will be understood that the method can comprise moving the upper storage container 15 to the first location before moving the lower storage container 15 to the second location, or moving the lower storage container 15 to the second location before moving the upper storage container 15 to the first location. Each of the first and second locations can be a container carrier 17, a shelf, a conveyor surface such as a conveyor belt, or another location.

In one embodiment, a method of handling upper and lower storage containers 15 so as to stack them on top of one another comprises coupling the end effector 100 to the upper and lower storage containers 15. This step can comprise causing a robotic manipulator 96 to move so as to align the end effector 100 with the lower storage container 15 at a first location, and translating the end effector 100 along the second direction $D_2$ such that a rim of a lower storage container 15 is slideably received in the channels 110 of the lower container holder 104. The method comprises causing the robotic manipulator 96 to move so as to align the end effector 100 with the upper storage container 15 at a second location, and translating the end effector 100 along the second direction $D_2$ such that a rim of a upper storage container 15 is slideably received in the channels 110 of the upper container holder 102. It will be understood that the step of coupling the end effector 100 to the upper and lower storage containers 15 can comprise coupling to the upper storage container 15 before coupling to the lower storage container 15 or coupling to the lower storage container 15 before coupling to the upper storage container 15.

The method comprises causing the at least one second linear actuator 122 to move at least one of the upper and lower container holders 102 and 104 inwards along the second direction $D_2$ so as to align the upper container holder 102 over the lower container holder 104, and hence align the upper storage container 15 over the lower storage container 15. The method comprises causing the at least one first linear actuator 120 to move at least one of the upper and lower container holders 102 and 104 towards the other so as to stack the upper storage container 15 onto the lower storage container 15. The method can then comprise causing the robotic manipulator 96 to move the end effector 100 to a third location such that the upper and lower storage containers 15 are supported at the third location, and causing the end effector 100 to translate along the second direction $D_2$ to decouple the end effector 100 from the upper and lower storage containers 15, thereby leaving the upper storage container 15 stacked on the lower storage container 15.

In alternative embodiments, the first and second pairs of arms of the end effector can be perpendicular to one another. In such embodiments, the robotic manipulator can move the end effector to pick up a first storage container using one of the first and second pairs of arms, rotate the end effector by 90 degrees, and move the end effector to pick up the second pair of arms. Such end effectors may be implemented using fewer moving parts than the end effector 100 shown in FIGS. 14 and 15. Thus, such end effectors can be simpler to implement. However, such end effectors, which pick up only one storage container at a time, might also increase the time that it takes to pick up storage containers over the end effector 100 in FIGS. 14 and 15, which picks up two storage containers at a time.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:
1. A storage module comprising:
first and second module ends that are spaced from one another along a longitudinal direction;

first and second conveyor segments that extend between the first and second module ends, the first and second conveyor segments being spaced from one another along a vertical direction;

third and fourth conveyor segments disposed at the first and second module ends, respectively, the third and fourth conveyor segments connecting the first and second conveyor segments so as to define a movement path that defines a closed shape that is elongate along the longitudinal direction;

a plurality of container carriers configured to be supported by the first to fourth conveyor segments, each container carrier configured to support at least one inventory storage container that is configured to support at least one inventory item therein; and at least one movement system, each movement system comprising an actuator and a catch that is coupled to the actuator, the actuator configured to move the catch inwardly along the longitudinal direction such that the catch engages at least one container carrier at one of the first and second module ends, and the catch pushes the container carrier towards the other one of the first and second module ends, wherein the storage module is configured to translate inventory storage containers around the movement path until one of the inventory storage containers is presented at one of the first and second module ends.

2. The storage module of claim 1, wherein the catch supports at least one carrier engagement surface that is configured to engage a container carrier as the catch moves inwardly so as to push the container carrier along one of the first and second conveyor segments.

3. The storage module of claim 2, wherein the catch is implemented as a plate having a plate body that carries the at least one carrier engagement surface.

4. The storage module of claim 1, wherein the catch supports first and second carrier engagement surfaces, the first and second carrier engagement surfaces being spaced from one another along the vertical direction, the first carrier engagement surface being configured to engage a container carrier so as to push the container carrier along the first conveyor segment, and the second carrier engagement surface being configured to engage a container carrier so as to push the container carrier along the second conveyor segment.

5. The storage module of claim 4, wherein:
the at least one movement system comprises first and second movement systems;
the first and second carrier engagement surfaces of the catch of the first movement system are configured to push container carriers towards the second module end along the first and second conveyor segments, respectively; and
the first and second carrier engagement surfaces of the catch of the second movement system are configured to push container carriers towards the first module end along the first and second conveyor segments, respectively.

6. The storage module of claim 1, wherein the at least one movement system comprises:
a first movement system adjacent the first module end, the first movement system being configured to push container carriers along at least the first conveyor segment in a first direction, and
a second movement system adjacent the second module end, the second movement system being configured to push container carriers along at least the second conveyor segment in a second direction.

7. The storage module of claim 6, wherein the at least one movement system comprises:
a third movement system offset from the first movement system along a lateral direction, the lateral direction being perpendicular to the longitudinal and vertical directions, and the third movement system being configured to push container carriers along at least the first conveyor segment in the first direction; and
a fourth movement system offset from the second movement system along the lateral direction, the fourth movement system being configured to push container carriers along at least the second conveyor segment in the second direction.

8. The storage module of claim 1, wherein the actuator is configured to move the catch outwardly along the longitudinal direction so that the catch can engage another container carrier.

9. The storage module of claim 1, wherein:
each container carrier has a pair of carrier sides that are spaced from one another along a lateral direction, the lateral direction being perpendicular to the longitudinal and vertical directions, and each container carrier further has at least one protrusion that extends outwardly from at least one of the carrier sides, and
the catch is configured to engage the at least one protrusion so as to push the container carrier towards the other one of the first and second module ends.

10. The storage module of claim 9, wherein:
each container carrier has a protrusion that extends outwardly from each of the carrier sides;
the at least one movement system comprises first and second movement systems that are offset from one another along the lateral direction; and
the catch of each of the first and second movement systems is configured to engage a different one of the protrusions.

11. The storage module of claim 1, further comprising at least one movable container stop that can be selectively moved between an interference position and a released position,
wherein, when the at least one movable container stop is in the interference position, the movable container stop interferes with a container carrier on at least one of the first and second conveyor segments so as to prevent the container carrier from moving outwardly along the longitudinal direction onto one of the third and fourth conveyor segments, and
wherein, when the at least one movable container stop is in the released position, the interference with the container carrier on the at least one of the first and second conveyor segments is removed.

12. The storage module of claim 11, wherein:
the catch includes at least one guide surface that is ramped; and
the at least one movable container stop comprises:
a translating block that is configured to translate along the vertical direction between the interference position and the released position; and
an engagement surface that is configured to ride along the at least one guide surface as the catch moves along the longitudinal direction so as to cause the translating block to move along the vertical direction between the interference position and the released position.

13. A storage system, comprising:
a plurality of the storage modules of claim 1 stacked on top of one another,
wherein the at least one movement system of each storage module is configured to independently push container carriers of the storage module along the movement path of the storage module.

14. The storage system of claim 13, wherein the plurality of storage modules are stacked in at least first and second vertical stacks that are offset from one another.

15. A method of operating a storage system, the method comprising:
causing a location of an inventory storage container supported by a container carrier to be identified from a plurality of inventory storage containers supported by a plurality of container carriers, the plurality of container carriers supported by a storage module, the storage module comprising:
a first conveyor segment,
a second conveyor segment below the first conveyor segment along a vertical direction, and
third and fourth conveyor segments that are spaced from one another along a longitudinal direction and that connect the first and second conveyor segments to define a closed movement paths; and
causing the plurality of container carriers to be translated around the closed movement path of the storage module until the inventory storage container is presented at one of first and second module ends of the storage module by:
(1) causing at least one movement system to move a catch inwardly along the longitudinal direction such that the catch engages at least one container carrier at one of the first and second module ends and pushes the container carrier towards the other one of the first and second module ends, and
(2) causing container carriers to be translated along the vertical direction between the first and second conveyor segments.

16. The method of claim 15, wherein causing the at least one movement system to move the catch comprises:
causing a first movement system adjacent the first module end to push container carriers along the one of the first and second conveyor segments in a first direction; and
causing a second movement system adjacent the second module end to push container carriers along the other one of the first and second conveyor segments in a second direction that is opposite the first direction.

17. The method of claim 15, wherein causing the at least one movement system to move the catch comprises causing at least one carrier engagement surface carried by the catch to engage a container carrier so as to push the container carrier along one of the first and second conveyor segments.

18. The method of claim 7, wherein the catch is implemented as a plate having a plate body that supports the at least one carrier engagement surface, and wherein causing the at least one movement system to move the catch comprises causing the catch to move along the longitudinal direction.

19. The method of claim 15, wherein causing the at least one movement system to move the catch comprises causing first and second carrier engagement surfaces that are carried by the catch to move along the longitudinal direction, the first and second carrier engagement surfaces being spaced from one another along the vertical direction and aligned with the first and second conveyor segments, respectively.

20. The method of claim 15, further comprising causing the storage module to be identified from a plurality of storage modules that are stacked over one another.

\* \* \* \* \*